United States Patent
Simpson et al.

(10) Patent No.: US 10,774,863 B2
(45) Date of Patent: Sep. 15, 2020

(54) BLIND FASTENER SYSTEM WITH ELECTROMAGNETIC EFFECTS-PROTECTIVE COATING

(71) Applicant: The Boeing Company, Chicago, IL (US)

(72) Inventors: Blake A. Simpson, Kent, WA (US); Dave G. Ellsworth, Kent, WA (US); Stephen G. Holley, Gig Harbor, WA (US); Michael Howard-Edward Ware, Renton, WA (US); Casey M. Cowell, Renton, WA (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 16/011,162

(22) Filed: Jun. 18, 2018

(65) Prior Publication Data

US 2019/0383319 A1    Dec. 19, 2019

(51) Int. Cl.
| | | |
|---|---|---|
| *F16B 19/10* | (2006.01) | |
| *C23C 30/00* | (2006.01) | |
| *B64D 45/02* | (2006.01) | |
| *F16B 19/04* | (2006.01) | |

(52) U.S. Cl.
CPC .......... *F16B 19/1054* (2013.01); *C23C 30/00* (2013.01); *B64D 45/02* (2013.01); *F16B 19/10* (2013.01); *F16B 2019/045* (2013.01)

(58) Field of Classification Search
CPC ...................... F16B 13/061; F16B 19/1054; F16B 19/1072; F16B 2019/045; F16B 37/067; F16B 19/10; C23C 30/00; B64D 45/02
USPC .................. 411/34, 39–40, 43, 914
See application file for complete search history.

(56) References Cited

U.S. PATENT DOCUMENTS

| | | | | |
|---|---|---|---|---|
| 3,136,203 A | * | 6/1964 | Davis | F16B 19/1054 411/38 |
| 4,609,315 A | * | 9/1986 | Briles | F16B 19/1045 403/408.1 |
| 7,857,563 B2 | * | 12/2010 | Pratt | F16B 19/1054 411/34 |
| 8,979,453 B2 | * | 3/2015 | Hufnagl | F16B 19/1072 411/34 |
| 10,006,478 B2 | * | 6/2018 | Hufnagl | F16B 5/0258 |
| 2004/0247412 A1 | * | 12/2004 | Reck | B21J 15/048 411/386 |
| 2007/0243035 A1 | * | 10/2007 | Pratt | F16B 31/021 411/15 |
| 2009/0053006 A1 | * | 2/2009 | Hufnagl | F16B 29/00 411/34 |

(Continued)

FOREIGN PATENT DOCUMENTS

WO    WO 2014/074862      5/2014

OTHER PUBLICATIONS

European Patent Office, "Communication pursuant to Article 94(3) EPC," App. No. 19 175 415.9 (dated Nov. 11, 2019).

(Continued)

*Primary Examiner* — Roberta S Delisle
(74) *Attorney, Agent, or Firm* — Walters & Wasylyna LLC

(57) ABSTRACT

A blind fastener system including a sleeve and, optionally, a core bolt insertable into the sleeve, wherein at least one of the sleeve and the core bolt includes a lubricious metallic coating containing at least one of tin, bismuth, indium and aluminum.

21 Claims, 15 Drawing Sheets

(56) References Cited

U.S. PATENT DOCUMENTS

2014/0044498 A1* 2/2014 Hufnagl .............. F16B 19/1072
　　　　　　　　　　　　　　　　　　　　411/43
2014/0130335 A1　5/2014 Bickford et al.
2015/0337885 A1* 11/2015 Whitlock .............. F16B 35/048
　　　　　　　　　　　　　　　　　　　　411/411
2016/0215804 A1* 7/2016 Hufnagl ................ F16B 5/0258

OTHER PUBLICATIONS

European Patent Office, Extended European Search Report, App. No. 19175415.9 (dated Oct. 23, 2019).
European Patent Office, "Communication pursuant to Article 94(3) EPC," App. No. 19 175 415.9 (Jul. 21, 2020).

* cited by examiner

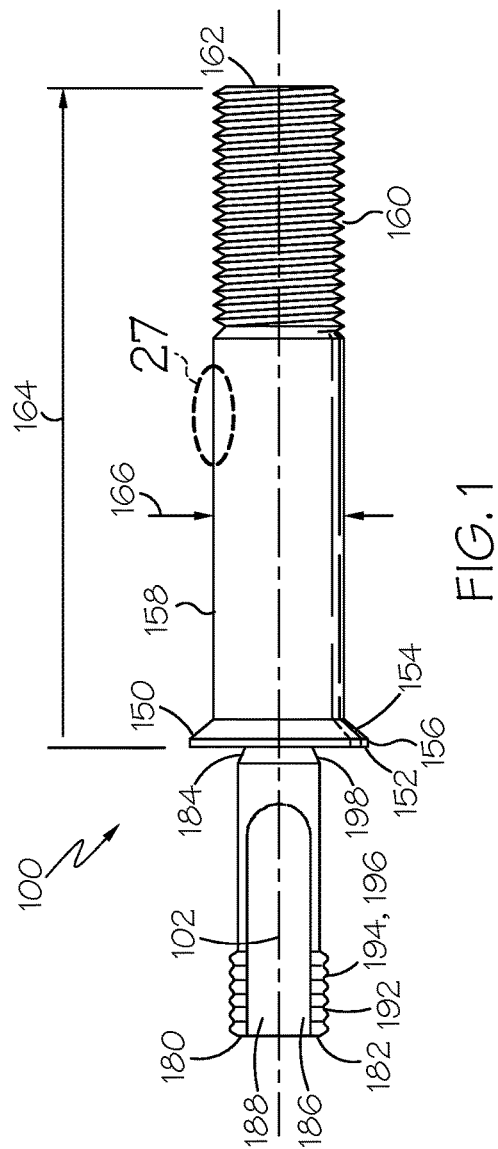
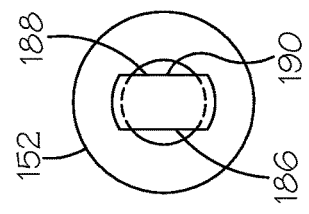
FIG. 1
FIG. 2
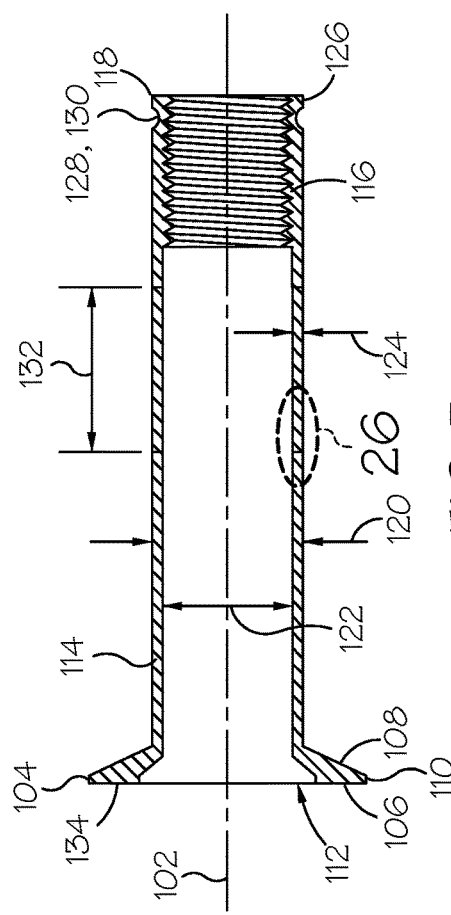
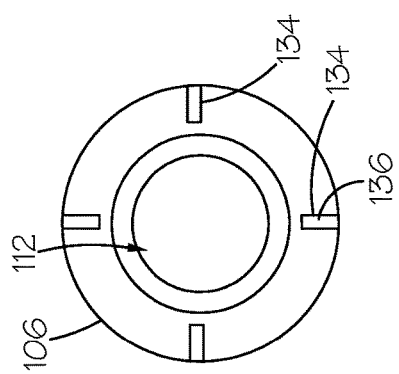
FIG. 3
FIG. 4

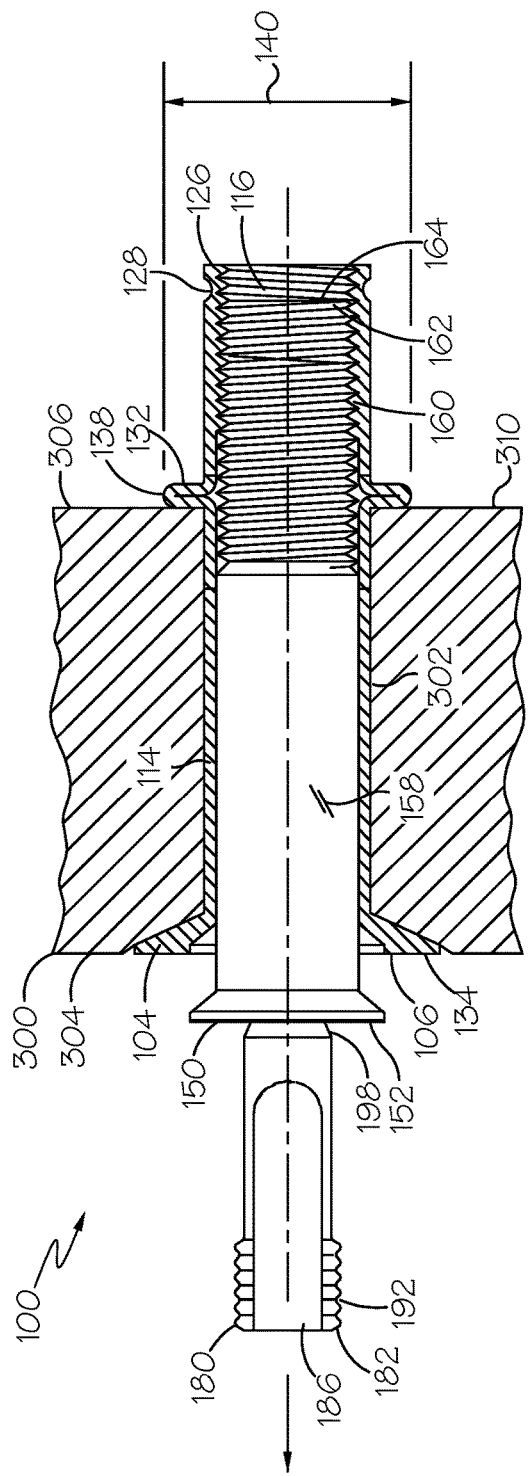
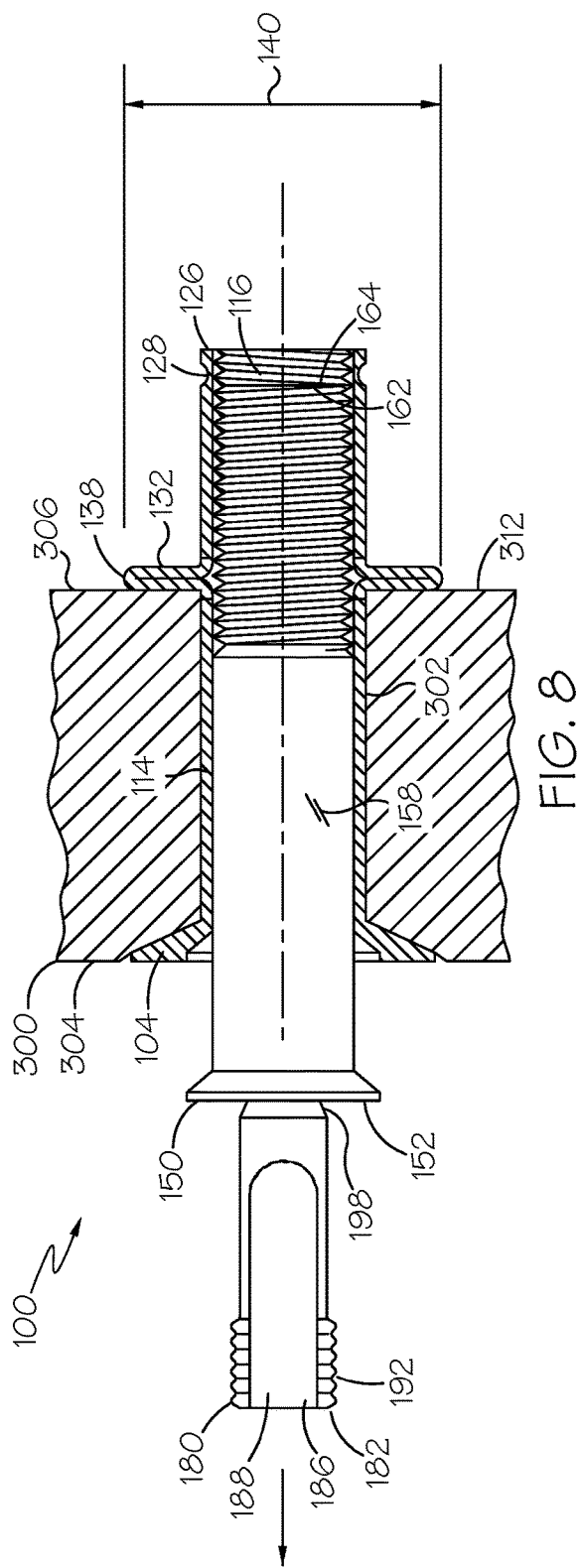

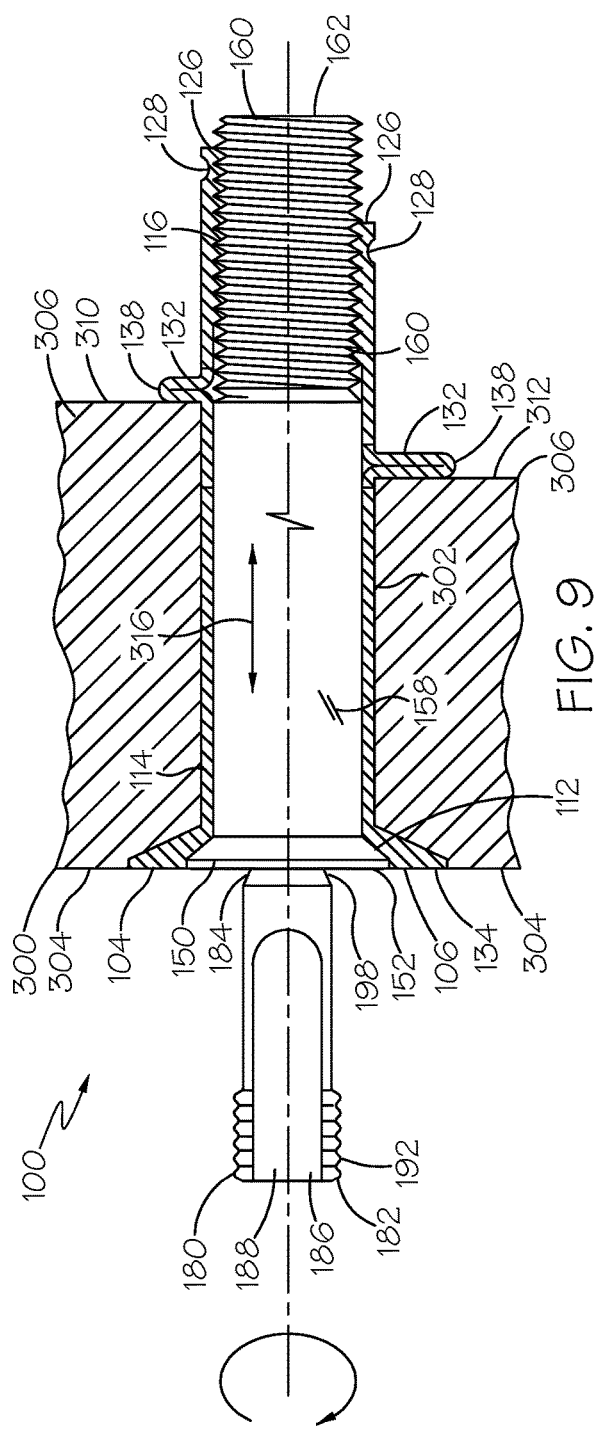
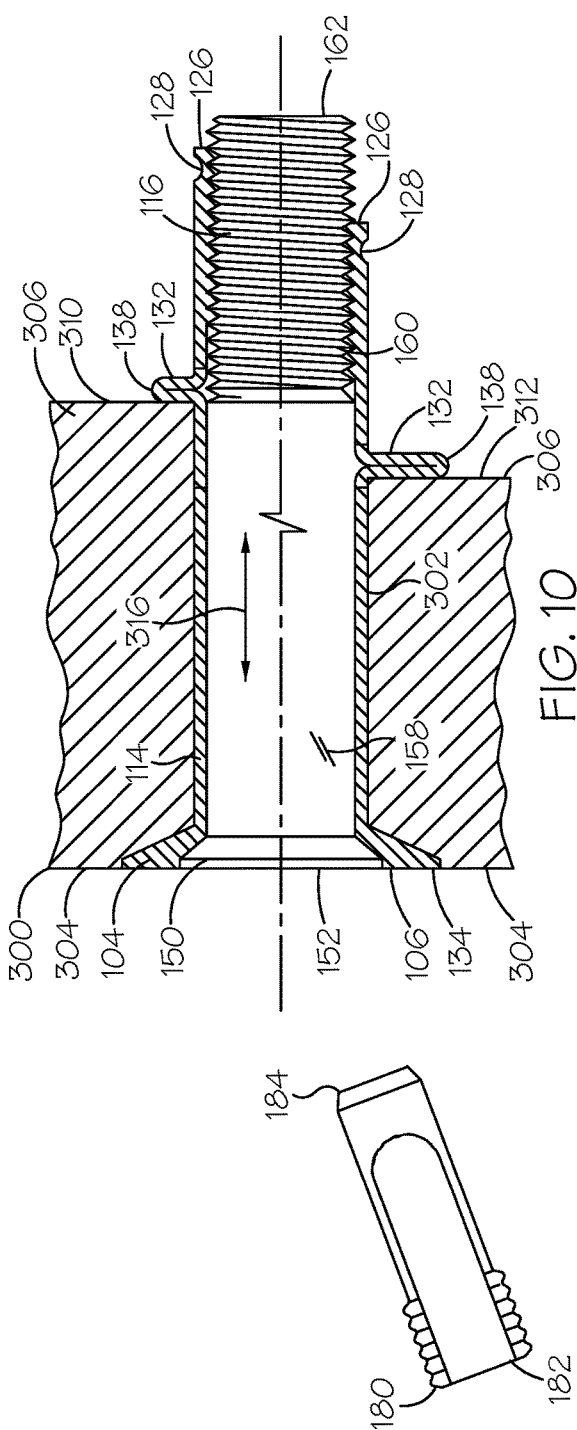

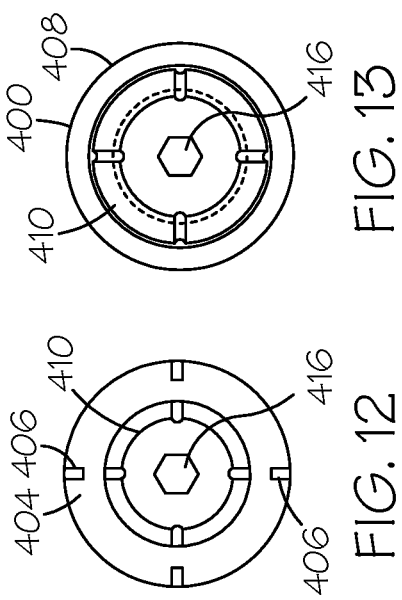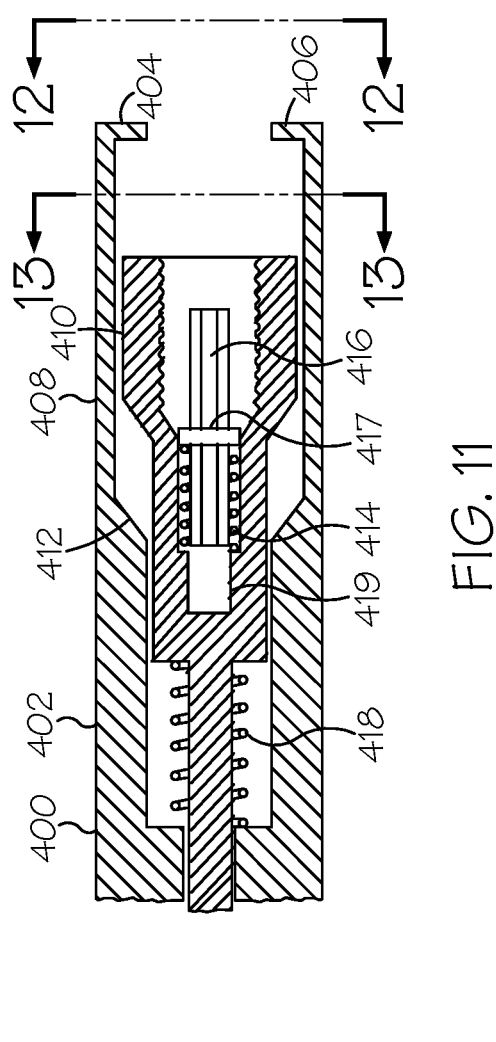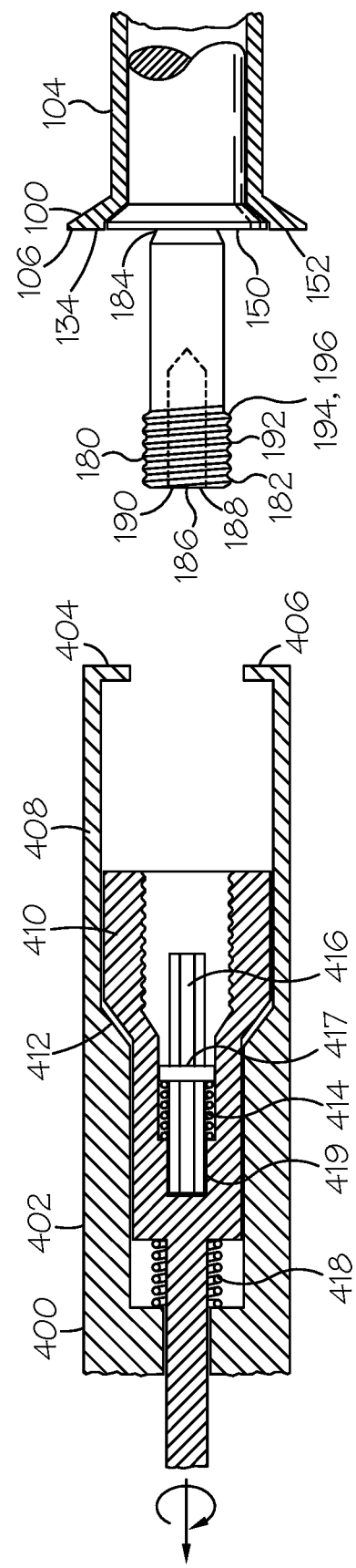

BLIND FASTENER SYSTEM WITH ELECTROMAGNETIC EFFECTS-PROTECTIVE COATING

FIELD

This application relates to blind fastener systems and, more particularly, to coatings that provide electromagnetic effects (EME) protection for blind fastener systems.

BACKGROUND

Mechanical fasteners are widely used for joining two or more components of a structural assembly. For example, mechanical fasteners are extensively used for joining the structural components of the airframe of an aircraft.

Blind fastener systems, also commonly known as one-sided-installation fasteners, are a particular type of mechanical fastener. Blind fastener systems include a core bolt and a sleeve, wherein both the core bolt and the sleeve are inserted into an appropriate bore in a structural assembly and engage the structural assembly from just one side of the structural assembly, without the need for accessing the opposite side of the structural assembly. Therefore, blind fastener systems are particularly suitable for use in applications where access to one side of a structural assembly is difficult or unavailable.

Aircraft experience electromagnetic effects (EME) from a variety of sources, such as lightning strikes and precipitation static. Metallic aircraft structures are readily conductive and, therefore, are relatively less susceptible to electromagnetic effects. However, composite (e.g., carbon fiber reinforced plastic) aircraft structures do not readily conduct away the significant electrical currents and electromagnetic forces stemming from electromagnetic effects. Therefore, when mechanical fasteners, such as blind fastener systems, are used in composite aircraft structures, steps must be taken to protect against electromagnetic effects.

Accordingly, those skilled in the art continue with research and development efforts in the field of blind fastener systems.

SUMMARY

In one embodiment, the disclosed blind fastener system includes a sleeve having a lubricious metallic coating containing at least one of tin, bismuth, indium and aluminum.

In another embodiment, the disclosed blind fastener system includes a sleeve having a lubricious metallic coating containing at least one of tin, bismuth and indium.

In another embodiment, the disclosed blind fastener system includes a sleeve having a lubricious metallic coating containing aluminum, such as substantially pure aluminum.

In another embodiment, the disclosed blind fastener system includes a sleeve and a core bolt insertable into the sleeve, wherein at least one of the sleeve and the core bolt includes a lubricious metallic coating containing at least one of tin, bismuth, indium and aluminum.

In another embodiment, the disclosed blind fastener system includes a sleeve and a core bolt insertable into the sleeve, wherein at least one of the sleeve and the core bolt includes a lubricious metallic coating containing at least one of tin, bismuth and indium.

In yet another embodiment, the disclosed blind fastener system includes a sleeve and a core bolt insertable into the sleeve, wherein at least one of the sleeve and the core bolt includes a lubricious metallic coating containing aluminum, such as substantially pure aluminum.

In one embodiment, the disclosed method for imparting electromagnetic effects protection to a blind fastener system that includes a sleeve and a core bolt includes the step of coating at least one of the sleeve and the core bolt with a coating composition that includes at least one of tin, bismuth, indium and aluminum.

In another embodiment, the disclosed method for imparting electromagnetic effects protection to a blind fastener system that includes a sleeve and a core bolt includes the step of coating at least one of the sleeve and the core bolt with a coating composition that includes at least one of tin, bismuth and indium.

In yet another embodiment, the disclosed method for imparting electromagnetic effects protection to a blind fastener system that includes a sleeve and a core bolt includes the step of coating at least one of the sleeve and the core bolt with a coating composition that includes aluminum, such as substantially pure aluminum.

Other embodiments of the disclosed blind fastener system with electromagnetic effects-protective coating, as well as the associated method for imparting electromagnetic effects protection to a blind fastener system, will become apparent from the following detailed description, the accompanying drawings and the appended claims.

BRIEF DESCRIPTION OF THE DRAWINGS

FIG. 1 is a side view of a core bolt of a blind fastener system;

FIG. 2 is an end view of the core bolt of FIG. 1 having a frangible driving provision included with the core bolt head;

FIG. 3 is a sectional side view of a sleeve of the blind fastener system having a softened portion along a portion of a length of the sleeve;

FIG. 4 is an end view of the sleeve of FIG. 3;

FIG. 7 is a sectional side view of the fastener system of FIG. 6 in a maximum grip installation and illustrating the frangible driving provision and core bolt being axially translated backward away from a front side of the structure and buckling of the softened portion of the sleeve;

FIG. 8 is a sectional side view of the fastener system of FIG. 7 in a minimum grip installation and illustrating the frangible driving provision and core bolt axially translated backward away from the front side of the structure and buckling of the softened portion of the sleeve;

FIG. 9 is a sectional side view of the fastener system of FIG. 8 illustrating rotation of the frangible driving provision and the core bolt relative to the sleeve to apply a tension in the fastener system for minimum and maximum grip installations;

FIG. 10 is a sectional side view of the core bolt, sleeve, and structure and further illustrating the separation of the frangible driving provision from the core bolt head at a pre-defined fastener preload for minimum and maximum grip installations;

FIG. 11 is a sectional side view of a configuration of an installation tool;

FIG. 12 is an end view of the installation tool of FIG. 11;

FIG. 13 is a sectional end view of the installation tool of FIG. 11;

FIG. 14 is a sectional side view of a further configuration of an installation tool;

FIG. 15 is a side view of a frangible driving provision configured complementary to the installation tool shown in FIG. 14;

DETAILED DESCRIPTION

It has now been discovered that advantage may be gained by coating the sleeve (or both the sleeve and the core bolt) of a blind fastener system with an electromagnetic effects-protective coating, as is disclosed herein. The disclosed electromagnetic effects-protective coating may be used with various blind fastener systems that include a core bolt received in a sleeve, whether the sleeve is threaded or not threaded, without departing from the scope of the present disclosure.

Figure 5:
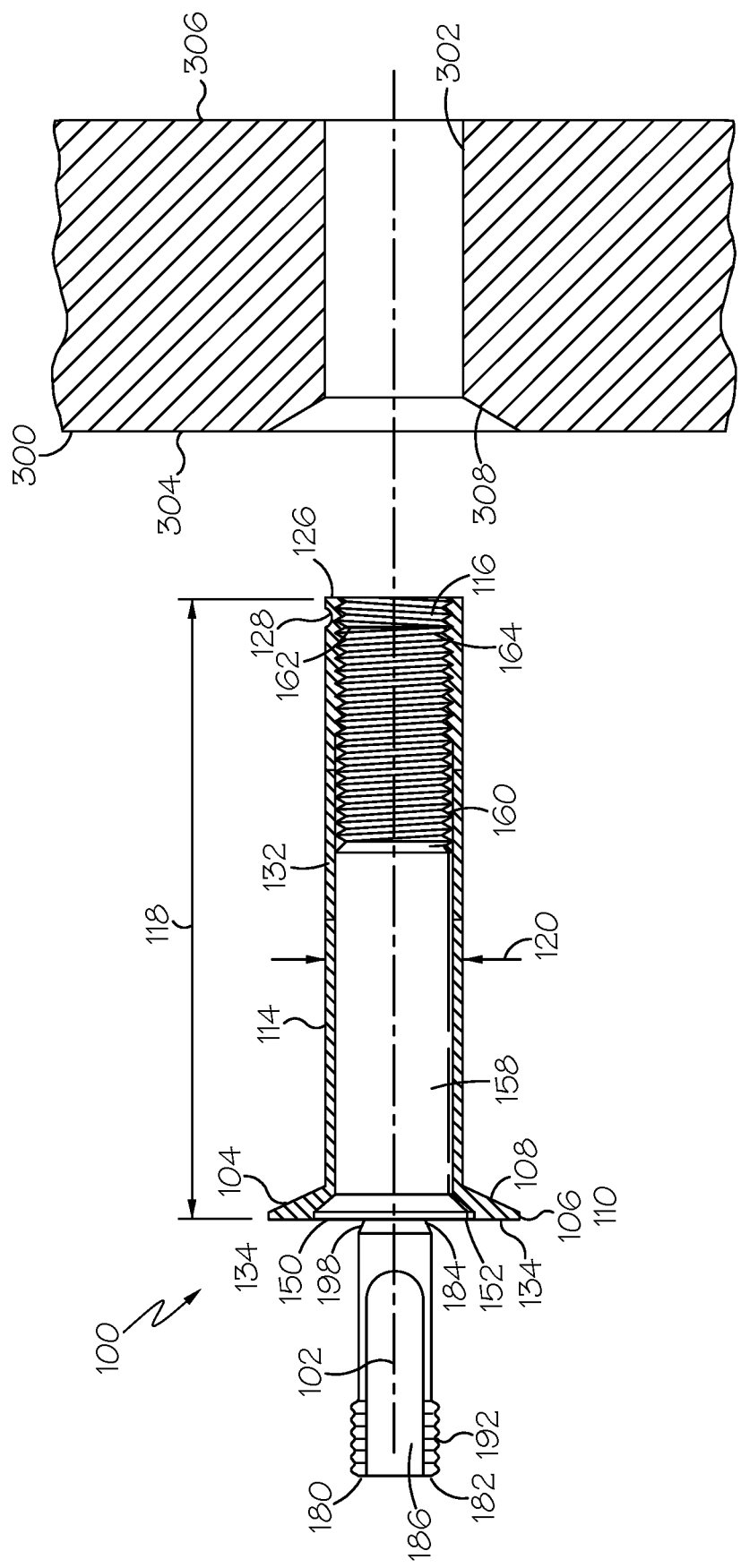
FIG. 5 is a sectional side view of the core bolt of FIG. 1 assembled with the sleeve of FIG. 3 prior to installation in a hole in a structure.

Referring now to the drawings wherein the figures are for purposes of illustrating various embodiments, shown in FIG. 1 is a side view of a core bolt 150 of an example blind fastener system 100 in accordance with one particular, non-limiting example of the present disclosure. FIG. 3 is a side view of a sleeve 104 that may be sized and configured to be assembled with the core bolt 150 of FIG. 1 for installation in a hole 302 of a structure 300 (FIG. 5). In FIG. 1, the core bolt 150 may include a core bolt head 152 having a core bolt shank 158. The core bolt shank 158 may have external core bolt threads 160 formed along at least a portion of a length of the core bolt shank 158 and terminating at a core bolt end 162. Although the core bolt shank 158 is shown as being substantially devoid of threads along a majority of the core bolt length 164, the core bolt shank 158 may be threaded along any portion of the core bolt length 164 from the core bolt head 152 to the core bolt end 162.

In FIG. 1, the core bolt threads 160 may be formed at a smaller diameter than the core bolt diameter 166. However, the core bolt threads 160 may be formed at any diameter relative to the core bolt diameter 166. The core bolt 150 is shown as having a countersunk head 156 having a core bolt bearing surface 154 with a tapered configuration. However, the core bolt head 152 may be provided in any configuration including a protruding head configuration (not shown) wherein the core bolt bearing surface 154 may have a generally flat or non-tapered configuration.

In FIGS. 1 and 2, a frangible driving provision 180 may be included with the core bolt head 152. In a configuration, the frangible driving provision 180 may be integrally formed with the core bolt head 152 and the core bolt shank 158. The frangible driving provision 180 may have a generally elongated shape and may protrude outwardly from the core bolt head 152. The frangible driving provision 180 may be generally aligned with a fastener axis 102 of the core bolt 150 and may have a generally smaller outer diameter than the core bolt head 152.

The frangible driving provision 180 may include an axial translation feature 192 and a rotation feature 186. The axial translation feature 192 may be configured to facilitate axial translation or displacement of the core bolt head 152 along a backward direction away from a front side 304 (FIG. 5) of the structure 300 (FIG. 5) to cause buckling of a softened portion 132 (FIG. 5) of the sleeve 104 (FIG. 3) against a back side 306 (FIG. 5) of the structure 300 during an initial part of the installation of the blind fastener system 100. The rotation feature 186 may be configured to rotate the core bolt 150 relative to the sleeve 104 to apply a tension preload in the blind fastener system 100 after the buckling of the softened portion 132 against the back side 306 of the structure 300 as described in greater detail below.

In FIG. 2, the axial translation feature 192 may comprise at least one of helical threads 194 (FIG. 15), annular grooves 196, or other geometry that may be formed on the frangible driving provision 180 for axially translating the core bolt 150. The helical threads 194 may be formed on an exterior of the frangible driving provision 180 and may be configured to be engaged by an installation tool 400 (FIGS. 11-14) for installing the blind fastener system 100. For example, the helical threads 194 may be formed at the same thread pitch and thread size as the internal threads of a collet 410 of an installation tool 400 (FIGS. 11-14) as described below. The helical threads 194 may be interrupted by a pair of opposing flats of the rotation feature 186 of the frangible driving provision 180, or the helical threads 194 may be continuous (not shown) around the frangible driving provision 180. The helical threads 194 may be formed at a length that allows for sufficient engagement by the collet 410 threads such that the installation tool 400 may transfer an axial load (not shown) of sufficient magnitude to the frangible driving provision 180 to flatten the buckled sleeve portion 138 against the back side 306 of the structure 300 as shown in FIGS. 7 and 8.

The axial translation feature 192 may optionally comprise annular grooves 196 (FIGS. 1, 19, and 22) that may be configured complementary to a collet 410 (FIGS. 18 and 20) of an installation tool 400 such that the collet 410 may grip the annular grooves 196 and axially translate the core bolt 150 away from the front side 304 of the structure 300. The annular grooves 196 in FIG. 19 may be formed at a groove pitch and diameter that is complementary to the collet 410 in FIG. 18. In addition, the annular grooves 196 may be configured to facilitate release of the frangible driving provision 180 from the collet 410 when the frangible driving provision 180 fractures from the core bolt head 152, as illustrated in FIG. 10 and described below. For example, the annular grooves 196 may have ramped surfaces to allow the collet 410 to slidably release the frangible driving provision 180 after fracturing from the core bolt head 152.

Although shown as being formed on an exterior of the frangible driving provision 180, the axial translation feature 192 may be formed on an interior of the frangible driving provision 180 such as within a bore (not shown) that may be formed within the frangible driving provision 180. The rotation feature 186 may comprise one or more faceted surfaces 188 or other features formed on the interior or exterior of the frangible driving provision 180 and configured to facilitate rotation of the frangible driving provision 180 and the core bolt 150. For example, FIG. 2 illustrates the frangible driving provision 180 having external faceted surfaces 188 comprising opposing flats 190 for receiving a rotational drive member (e.g., a rotational socket with a rectangular slot—not shown) of an installation tool described below.

The frangible driving provision 180 may be configured to be separated from the core bolt head 152 following the application of tension preload in the blind fastener system 100. For example, the frangible driving provision 180 may comprise a frangible pintail 182 having a break groove 184 at an interface 198 between the frangible pintail 182 and the core bolt head 152. The break groove 184 may provide a reduced cross sectional area at the interface 198 relative to the cross sectional area along a remainder of the frangible pintail 182.

Referring to FIG. 3, shown is a side view of the sleeve 104 of the blind fastener system 100. The sleeve 104 may have a sleeve head 106 and a sleeve shank 114 having a generally hollow tubular configuration extending from the sleeve head 106 to a sleeve tail 126 and defining a sleeve length 118. The sleeve 104 may have a sleeve inside diameter 122 sized complementary to the core bolt diameter 166 (FIG. 1). The sleeve 104 may have a sleeve outside diameter 120 that may be sized complementary to the diameter of a hole 302 (FIG. 5) in the structure 300 (FIG. 5). For example, the sleeve outside diameter 120 may be sized and configured to provide a clearance fit or an interference fit with a hole 302 in the structure 300 (FIG. 5) as described below. The sleeve shank 114 may be provided in a sleeve wall thickness 124 that may be dictated in part by the sleeve outside diameter 120. For example, for a sleeve outside diameter 120 of approximately 0.25 inch, the sleeve wall thickness 124 may be approximately 0.015 to 0.030 inch. For a sleeve outside diameter 120 of approximately 0.38 inch, the sleeve wall thickness 124 may be approximately 0.030 to 0.050 inch. However, the sleeve 104 may be provided in any sleeve wall thickness 124 and is not limited to the above noted ranges.

In FIG. 3, the sleeve 104 may include a softened portion 132 such as an annealed portion extending along at least a portion of the sleeve length 118. The softened portion 132 may be positioned along the sleeve length 118 such that the softened portion 132 may be buckled against the back side 306 (FIG. 5) of the structure 300 to form a buckled sleeve portion 138 (FIG. 7). The softened portion 132 may be annularly-shaped or band-shaped and may have increased ductility, increased softness, increased propensity to buckle under axially-compressive loading, and/or increased formability relative to the ductility, softness, propensity to buckle, or formability of the sleeve 104 at locations outside of the softened portion 132. The softened portion 132 may be formed in the sleeve 104 by any one of a variety of different means including, but not limited to, localized heat treatment or annealing of the sleeve 104 such as by using an inductive coil (not shown) placed over the sleeve 104 at a location where softening of the sleeve 104 material is desired. The softened portion 132 may also be formed in the sleeve 104 by varying the sleeve cross-section (not shown) such as with a reduced sleeve wall thickness (not shown) which may provide an increased propensity for buckling under axial loading. However, the softened portion 132 may be formed in the sleeve 104 in any one of a variety of different means and is not limited to annealing by localized heat treatment.

In FIG. 3, the sleeve shank 114 may include internal sleeve threads 116 formed on an end of the sleeve 104. The internal sleeve threads 116 may be formed complementary to the core bolt threads 160 and may terminate at the sleeve tail 126. The sleeve tail 126 may include a locking feature 128 configured to restrict rotation of the core bolt 150 relative to the sleeve 104 such as after installation of the blind fastener system 100 in a structure. The locking feature 128 may comprise a sleeve annular groove 130 that may be formed on the sleeve shank 114 adjacent the sleeve tail 126. However, the locking feature 128 may be configured in any one of a variety of different configurations and is not limited to a sleeve annular groove 130. In this regard, the locking feature 128 may comprise any mechanism that may restrict rotation of the core bolt threads 160 relative to the internal sleeve threads 116. For example, the locking feature 128 may comprise a nylon patch formed on the internal sleeve threads 116 adjacent the sleeve tail 126. Alternatively, the locking feature 128 may comprise a local deformation of the internal sleeve threads 116 to restrict rotation of the core bolt 150 relative to the sleeve 104 following installation of the blind fastener system 100 within a structure.

Referring to FIGS. 3 and 4, the sleeve 104 is shown as having a countersunk head 110 having a sleeve bearing surface 108 with a tapered configuration for bearing against a structure 300 (FIG. 5). However, the sleeve head 106 may be provided in a protruding head configuration (not shown) wherein the sleeve bearing surface 108 may be generally flat and/or parallel to a surface of the structure 300. In this regard, the sleeve head 106 may be provided in any configuration and is not limited to a countersunk head configuration or a protruding head configuration. The sleeve head 106 may include a core bolt pocket 112 that may be sized and configured to receive the core bolt head 152. In the configuration shown, the sleeve head 106 is sized and configured to receive a core bolt 150 having a countersunk configuration as shown in FIG. 1. However, as indicated above, the sleeve head 106 and the core bolt head 152 may be provided in any one of a variety of combinations of a countersunk head, a protruding head (not shown), or other head configurations.

In FIG. 4, the sleeve head 106 may include an anti-rotation feature 134 to provide a means for preventing rotation of the sleeve 104 relative to the core bolt 150 and/or relative to a hole 302 (FIG. 5) in the structure 300 (FIG. 5) during installation of the blind fastener system 100. For example, the sleeve head 106 may include one or more indentations or protrusions 136 that may be sized and configured to be engaged by an installation tool (not shown) to prevent rotation of the sleeve 104 relative to the core bolt 150 and/or a hole 302 (FIG. 5) through which the sleeve 104 extends.

The sleeve 104 and the core bolt 150 may be formed of any one of a variety of different materials, including any metallic material and/or nonmetallic material. For example, the core bolt 150 and/or the sleeve 104 may be formed of titanium alloys including 6-6-2 Ti, 6-4 Ti, 3-8 Ti and other titanium alloys. The core bolt 150 and/or the sleeve 104 may also be formed of steel and/or stainless steel including stainless steel alloys such as A286, A304, and A266 CRES or other stainless steel alloys. The core bolt 150 and/or the sleeve 104 may also be formed of Inconel, nickel, cobalt and any alloys or combinations thereof.

Referring to FIG. 5, shown is the core bolt 150 assembled with the sleeve 104 prior to installation of the core bolt 150/sleeve 104 assembly into a hole 302 of a structure 300. The structure 300 may have a front side 304 and a back side 306. The core bolt 150 is preferably sized such that the core bolt shank 158 of the core bolt 150 is not engaged in the locking feature 128 of the sleeve 104 when the blind fastener system 100 is initially installed in the hole 302 and prior to axially translating the core bolt 150. In FIG. 5, the locking feature 128 of the sleeve 104 may occupy approximately 2-3 or more of the internal sleeve threads 116. The softened portion 132 of the sleeve 104 is preferably positioned along the sleeve length 118 such that at least a part of the softened portion 132 lies beneath the surface of the back side 306 of the structure 300, as described in greater detail below.

In FIG. 5, the front side 304 of the structure 300 may have a structure bearing surface 308 that may be configured complementary to the sleeve bearing surface 108. For example, for a sleeve head 106 having a countersunk configuration with a tapered bearing surface, the structure bearing surface 308 may likewise be tapered. The hole 302 may have a hole 302 diameter that is preferably sized and configured complementary to the sleeve outside diameter 120. The hole 302 may be sized and configured to provide a clearance fit with the sleeve outside diameter 120 or to provide an interference fit with the sleeve outside diameter 120. In a configuration, the blind fastener system 100 may be installed by coating the sleeve 104 with a sealant prior to insertion into a hole 302 of a structure 300. For example, for installing a metallic sleeve 104/core bolt 150 assembly within a composite structure 300, the sleeve 104 may be coated with a wet sealant to protect against galvanic corrosion. The sleeve 104 may also include one or more types of coatings as part of its finished state. Such coatings may reduce friction during insertion of the sleeve 104 into a hole 302 (e.g., an interference fit hole) or for ease of installation in other types of holes such as clearance holes. Such coatings may comprise a lubricious coating such as an aluminum pigmented coating, dry film lubricant (e.g., molybdenum disulfide), or any one of a variety of other types of coatings.

Figure 6:
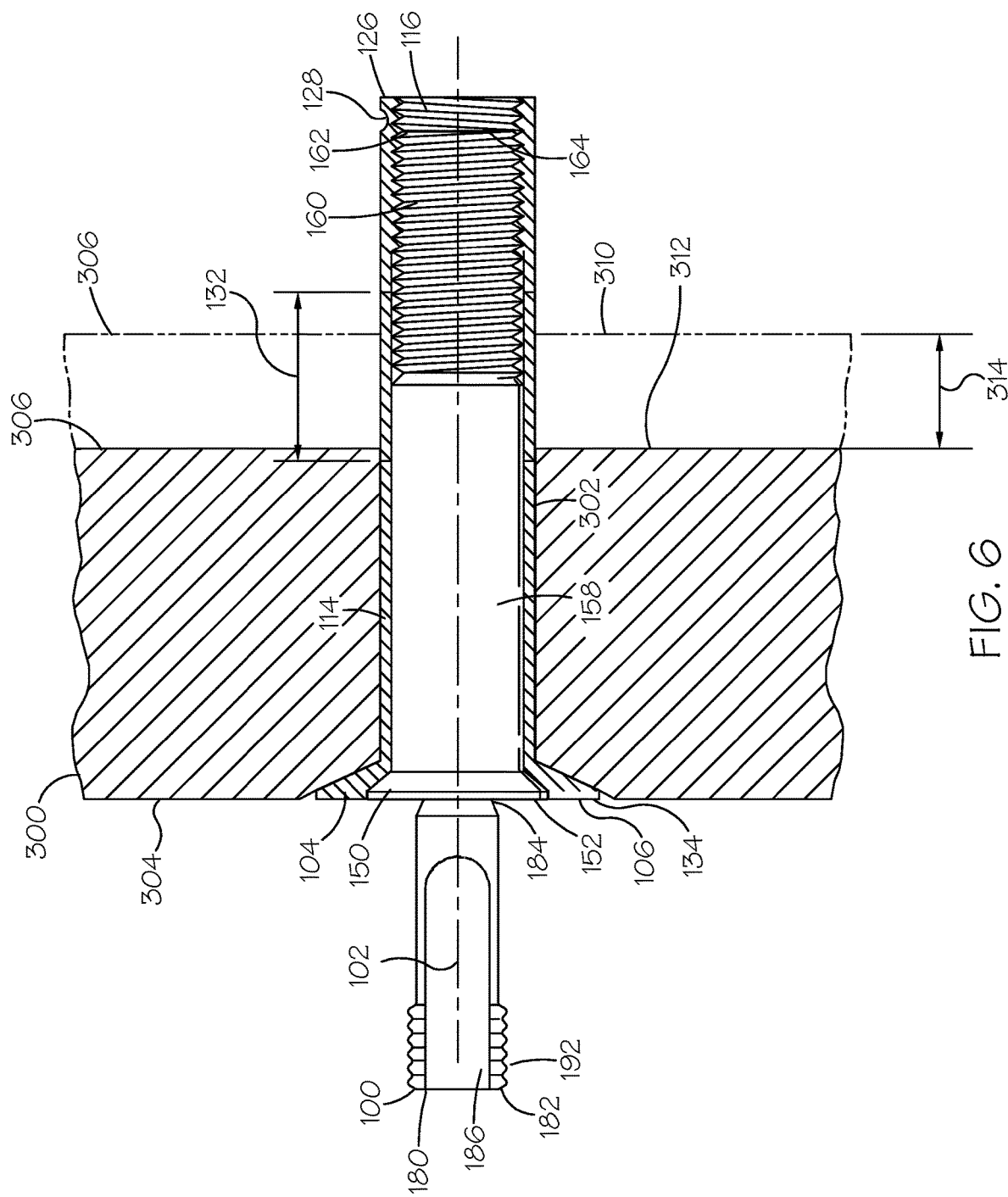
FIG. 6 is a sectional side view of the core bolt FIG. 1 and the sleeve of FIG. 3 installed in the structure of FIG. 5 and illustrating a minimum grip and a maximum grip capability of the fastener system.

Referring to FIG. 6, shown is a side view of the core bolt 150 and sleeve 104 installed in the structure 300 and illustrating a minimum grip 312 and a maximum grip 310 capability of the blind fastener system 100. FIG. 6 illustrates a structure 300 shown in solid lines representing a minimum grip 312 application for the blind fastener system 100. In a minimum grip 312 application, the sleeve 104 may be configured such that the softened portion 132 of the sleeve 104 extends above and below the surface of the back side 306 of the structure 300 to allow for buckling of the softened portion 132 against the back side 306. FIG. 6 also illustrates a structure 300 shown in phantom lines representing a maximum grip 310 application for the blind fastener system 100. In a maximum grip 310 application, the sleeve 104 may be configured such that the softened portion 132 of the sleeve 104 extends above and below the back side 306 of the structure 300 to allow for buckling of the softened portion 132 against the back side 306.

Advantageously, the disclosed blind fastener system 100 may be installed for a relatively large grip range 314 (e.g., large thickness variation) of structure 300. For example, a single configuration of the disclosed blind fastener system 100 may include a softened portion 132 that provides for a grip range 314 of at least 0.10 inch. Such a relatively large grip range 314 provided by the disclosed blind fastener system 100 advantageously minimizes the quantity of different fastener lengths that must be maintained in stock in comparison to the larger quantity of different fastener lengths that must be maintained in stock for conventional fastener systems having a relatively small grip range 314 (e.g., 0.050 or 0.063 inch). Additionally, a relatively large grip range may provide additional grip capability where installations may occur outside of the expected structural thicknesses due to structure manufacturing tolerances.

Referring to FIG. 7, shown is a side view of the blind fastener system 100 in an initial stage of installation in a maximum grip 310 application. The frangible driving provision 180 and the core bolt 150 are axially translated along a backward direction away from a front side 304 of the structure 300. The axial translation of the core bolt 150 may be provided by engaging the axial translation feature 192 of the frangible driving provision 180 with an installation tool as described below. The sleeve head 106 may be maintained in contact with the structure bearing surface 308 (FIG. 5) during axial translation of the core bolt 150. Displacement of the core bolt head 152 away from the front side 304 results in buckling of the softened portion 132 against the back side 306 of the structure 300. The softened portion 132 may buckle radially outwardly into a flattened, annularly-shaped, buckled sleeve portion 138 against the back side 306 of the structure 300.

Referring to FIG. 8, shown is a side view of the blind fastener system 100 during installation in a minimum grip 312 application. The core bolt head 152 is displaced at a greater distance away from the front side 304 of the structure 300 relative to the amount of core bolt head 152 displacement for the maximum grip 310 application shown in FIG. 7. In addition, the buckled sleeve portion diameter 140 for the minimum grip 312 application shown in FIG. 8 is larger than the buckled sleeve portion diameter 140 of the maximum grip 310 application shown in FIG. 7.

Advantageously, the sleeve 104 may be sized and configured such that the softened portion 132 buckles against the back side 306 into a flattened buckled sleeve portion 138 having a relatively large bearing area. For example, the sleeve 104 may be sized and configured such that the softened portion 132 buckles into a buckled sleeve portion 138 having a minimum diameter of 1.2 times the sleeve outside diameter 120 (FIG. 3). In this regard, the sleeve 104 may be configured such that the buckled sleeve portion diameter 140 is in the range of from approximately 1.2 to 1.5 times the sleeve outside diameter 120 (FIG. 3). However, the sleeve 104 may be sized and configured such that the buckled sleeve portion diameter 140 is larger or smaller than 1.2 to 1.5 times the sleeve outside diameter 120.

Referring to FIG. 9, shown is the blind fastener system 100 wherein rotational force may be applied to the core bolt 150 using the rotation feature 186 provided on the frangible driving provision 180. The upper portion of the structure 300 in FIG. 9 represents a maximum grip 310 installation in a structure 300 and the lower portion of the structure 300 in FIG. 9 represents a minimum grip 312 installation. In FIG. 9, the buckled sleeve portion 138 is substantially fully formed such that the core bolt 150 may be rotated without twisting deformation of the buckled sleeve portion 138 which may otherwise compromise the consistency of tension preload from fastener to fastener. The core bolt 150 may be rotated relative to the sleeve 104 by engaging the faceted surfaces 188 of the rotation feature 186 of the frangible pintail 182 in a manner causing rotation of the core bolt 150 relative to the sleeve 104. For example, an installation tool (not shown) may include a rotational drive bit configured to engage the rotation feature 186 on the frangible pintail 182.

Advantageously, rotation of the core bolt 150 relative to the sleeve 104 results in the application of tension preload in the blind fastener system 100 or an increase in the tension preload induced in the blind fastener system 100 as a result of the axial translation (FIGS. 7 and 8) of the core bolt 150. In FIG. 9, rotation of the frangible pintail 182 causes the core bolt head 152 to translate back toward the sleeve head 106 as the core bolt threads 160 engage the locking feature 128 on the sleeve tail 126. Tension preload may increase in the blind fastener system 100 (e.g., in the sleeve 104 and in the core bolt 150) while the core bolt 150 is rotated relative to the sleeve 104 until reaching a pre-defined fastener preload 316.

Referring to FIG. 10, shown is the blind fastener system 100 installation for a maximum grip 310 installation and a minimum grip 312 installation in a structure 300. Upon reaching the predefined fastener preload 316 (FIG. 9), the frangible driving provision 180 may separate from the core bolt head 152 by fracturing at the interface 198 between the frangible pintail 182 and the core bolt head 152. For example, the frangible pintail 182 may separate from the core bolt head 152 due to torsional load causing a fracture at break groove 184 that may be formed at the interface 198 between the frangible pintail 182 and the core bolt head 152. The frangible pintail 182 may also be separated from the core bolt head 152 by axially translating (e.g., pulling) the frangible driving provision 180 until exceeding a tension load capability at the interface 198 between the frangible pintail 182 and the core bolt head 152. Still further, the frangible pintail 182 may be separated from the core bolt head 152 by bending the frangible pintail 182 relative to the core bolt head 152 and causing fracturing under bending load.

The fastener preload 316 may comprise tension preload in the core bolt 150/sleeve 104 and may correspond to compression preload in the structure 300 representing clamp-up of one or more components that make up the structure 300. The blind fastener system 100 may be configured to control the point (i.e., the fastener preload) at which the frangible pintail 182 rotatably fractures (e.g., twists) off of the core bolt head 152 and may be derived through analysis and/or experimentation. For example, fastener preload 316 may be characterized by a quantity of revolutions of the frangible pintail 182 relative to the sleeve 104 after the buckled sleeve portion 138 is flattened against the back side 306 of the structure 300.

Referring to FIGS. 11-14, shown is a configuration of an installation tool 400 as may be implemented for installation of the blind fastener system 100 (FIG. 9). The installation tool 400 may include a housing 402 having a side wall 408 and a bearing flange 404. A collet 410 may be axially slidable within the housing 402 and may bear against a taper 412 that may be formed in the housing 402. An ejection spring 418 may be included with the installation tool 400 to eject the frangible driving provision 180 from the installation tool 400 after the frangible driving provision 180 (FIG. 10) or frangible pintail 182 (FIG. 10) fractures from the core bolt head 152 (FIG. 10). The collet 410 may be segmented as shown in FIG. 13 to allow the collet 410 segments to radially expand so that the collet 410 may be axially moved over the axial translation feature 192 (e.g., helical threads 194, annular grooves 196—FIG. 15) that may be formed on the frangible pintail 182 (FIG. 15). A rotational drive member 416 such as a hex pin may be axially slidable within the collet 410. The rotational drive member 416 (e.g., hex pin) may be engaged to the rotation feature 186 (e.g., hex bore) of the frangible pintail 182 (FIG. 15).

Referring to FIG. 12, shown is an end view of the installation tool 400 of FIG. 11 and illustrating the sleeve engagement features 406 that may be included with the bearing flange 404 for engaging anti-rotation features 134 that may be formed on the sleeve head 106 (FIGS. 3 and 4). FIG. 12 further illustrates a hex shape of the rotational drive member 416 (e.g., hex pin) for engaging the hex-shaped faceted surfaces 188 (e.g., hex bore) formed in the frangible pintail 182 (FIG. 15). FIG. 13 is a cross-sectional end view of the installation tool 400 illustrating the segmented collet 410 and the rotational drive member 416.

Referring to FIGS. 11-15, during operation, the installation tool 400 may be applied over the frangible pintail 182 such that the sleeve engagement features 406 on the bearing flange 404 engage the anti-rotation features 134 of the sleeve head 106. As the installation tool 400 is applied over the frangible pintail 182, the free end of the collet 410 contacts the free end of the frangible pintail 182 causing the segmented collet 410 to radially expand and axially move over the helical threads 194 that may be formed on the frangible pintail 182. The installation tool 400 may include a biasing spring 414 in the housing 402 to bias the rotational drive member 416 into the rotation feature 186 (e.g., hex-shaped bore) in the frangible pintail 182 as the collet 410 is axially moved over the helical threads 194 of the frangible pintail 182. The biasing spring 414 may have a larger diameter than an outer diameter or width of the rotational drive member 416 such that the biasing spring 414 may bear against an annular flange 417 formed on the rotational drive member 416.

After the bearing flange 404 of the installation tool 400 is seated against the sleeve head 106 and the collet 410 threads are engaged to the helical threads 194 of the frangible pintail 182, the collet 410 and the core bolt 150 may be axially translated backward away from the front side 304 (FIGS. 7 and 8) of the structure 300. An outer surface of the collet 410 may bear against the taper 412 formed on the interior of the housing 402 which may increase a clamping force of the collet 410 threads onto the helical threads 194 of the frangible pintail 182. The rotational drive member 416 is configured to initially prevent rotation of the core bolt 150 as the core bolt 150 is axially translated backward away from the front side 304 (FIGS. 7 and 8) by rotation of the collet 410. Rotation of the collet 410 continues until the softened portion 132 (FIGS. 7 and 8) of the sleeve 104 buckles into a flattened shape against the back side 306 of the structure 300 as shown in FIGS. 7 and 8.

When the flattening of the softened portion 132 (FIGS. 7 and 8) is completed, the rotational drive member 416 may be retracted within a hex bore 419 formed in the collet 410. The collet 410 and the rotational drive member 416 may then be rotated (FIG. 9) causing rotation of the core bolt 150 which causes an increase in tension preload in the blind fastener system 100 until reaching a pre-defined fastener preload. The break groove 184 in the frangible pintail 182 may be configured to separate or fracture (FIG. 10) from the core bolt head 152 at the pre-defined fastener preload. The ejection spring 418 may move the outer surface of the collet 410 away from the taper 412 in the housing 402 which may allow the segmented collet 410 to expand and release the frangible pintail 182. The frangible pintail 182 may be ejected from the collet 410 by the ejection spring 418.

Figure 16:
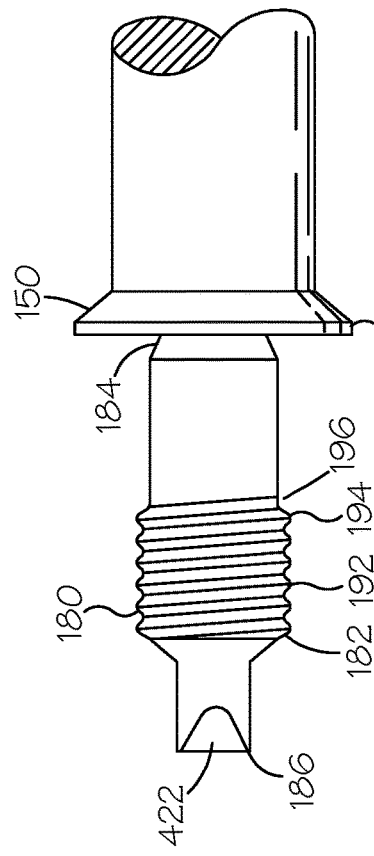
FIG. 16 is a side view of a configuration of a frangible driving provision.
Figure 17:
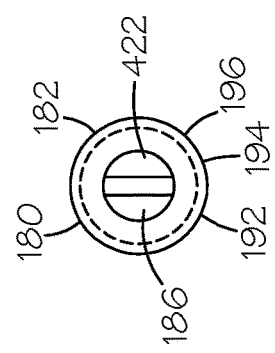
FIG. 17 is an end view of the frangible driving provision shown in FIG. 16.

Referring to FIGS. 16 and 17, shown is a configuration of the frangible driving provision 180 having an external rotation feature 186. The rotation feature 186 may comprise a pair of tapered flats 422 that may be sized and configured to be engaged by a complementary rotational drive member 416 (not shown) of an installation tool (not shown). The engagement of the frangible driving provision 180 in FIGS. 16 and 17 may be similar to the engagement described for the operation of the installation tool 400 shown in FIGS. 11-15.

Figure 19:
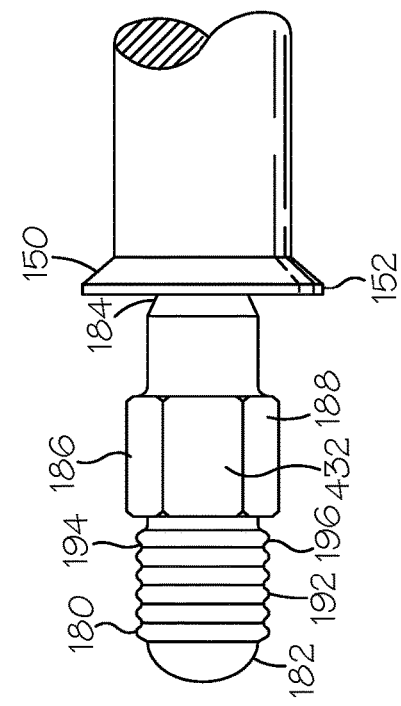
FIG. 19 is a side view of a frangible driving provision configured complementary to the installation tool shown in FIG. 18.
Figure 18:
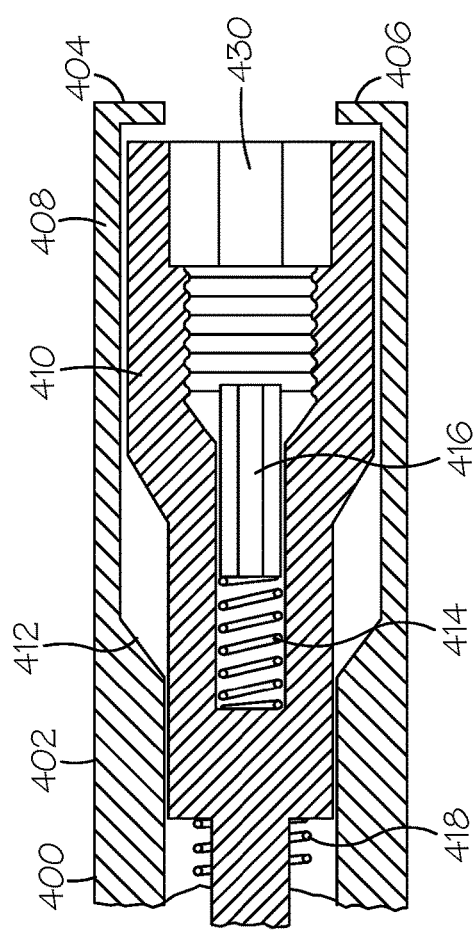
FIG. 18 is a sectional side view of a further configuration of an installation tool.

Referring to FIGS. 18 and 19, shown is a configuration of an installation tool 400 (FIG. 18) and a complementary frangible driving provision 180 (FIG. 19). The installation tool 400 may include interior wrench flats 430 configured to engage exterior wrench flats 432 that may be formed on the frangible driving provision 180. The installation tool 400 may include a collet 410 having annular grooves configured to engage complementary annular grooves 196 formed on the frangible driving provision 180 for axially translating the core bolt 150 relative to the sleeve 104. The exterior wrench flats 432 of the installation tool 400 may then be rotated to rotate the core bolt 150 to apply the desired tension preload to the blind fastener system 100.

Figure 22:
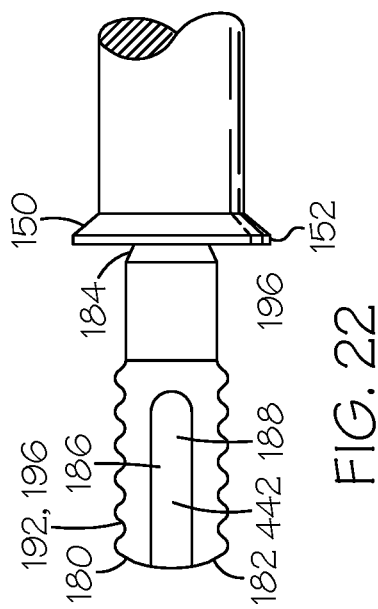
FIG. 22 is a side view of a frangible driving provision configured complementary to the installation tool shown in FIG. 20.
Figure 20:
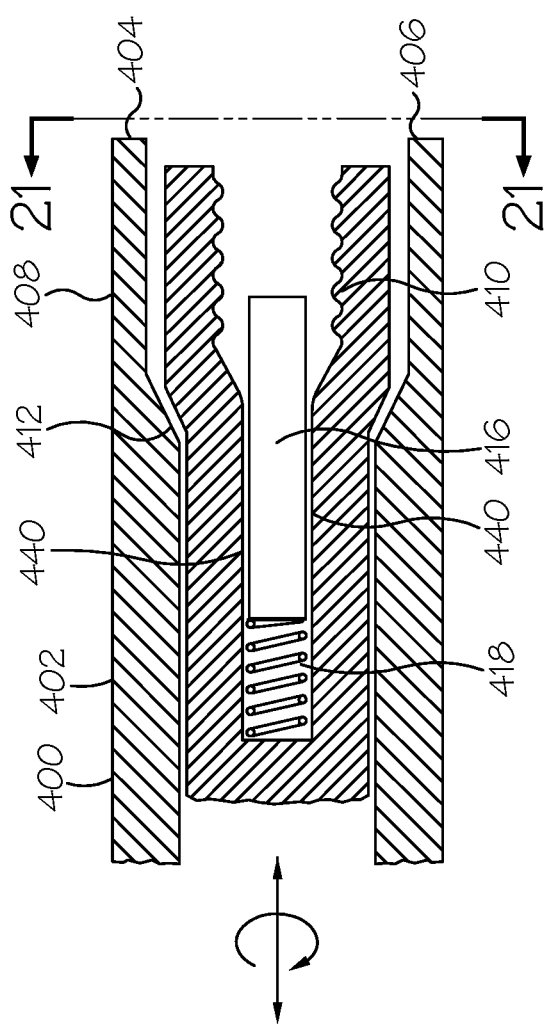
FIG. 20 is a sectional side view of a further configuration of an installation tool.
Figure 21:
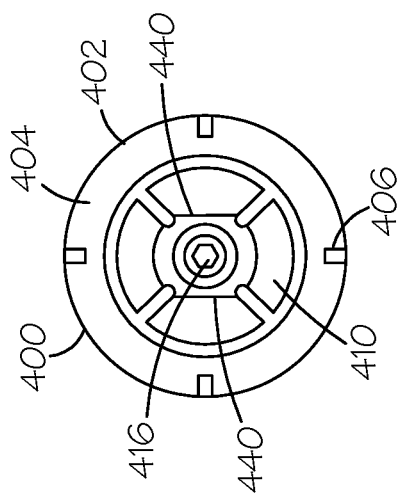
FIG. 21 is a sectional end view of the installation tool shown in FIG. 20.

Referring to FIGS. 20-22, shown is a configuration of an installation tool 400 having a segmented collet 410 with interior annular grooves for engaging external annular grooves 196 formed on the frangible driving provision 180 for pulling or axially translating the core bolt 150 away from the sleeve 104. FIG. 21 illustrates a pair of interior diametrical flats 440 formed in the collet 410 for engaging a complementary pair of exterior diametrical flats 442 on the frangible driving provision 180 (FIG. 22). Operation of the installation tool 400 in FIGS. 20-22 may be similar to the operation described above for the installation tool 400 shown in FIGS. 11-15.

Figure 23:
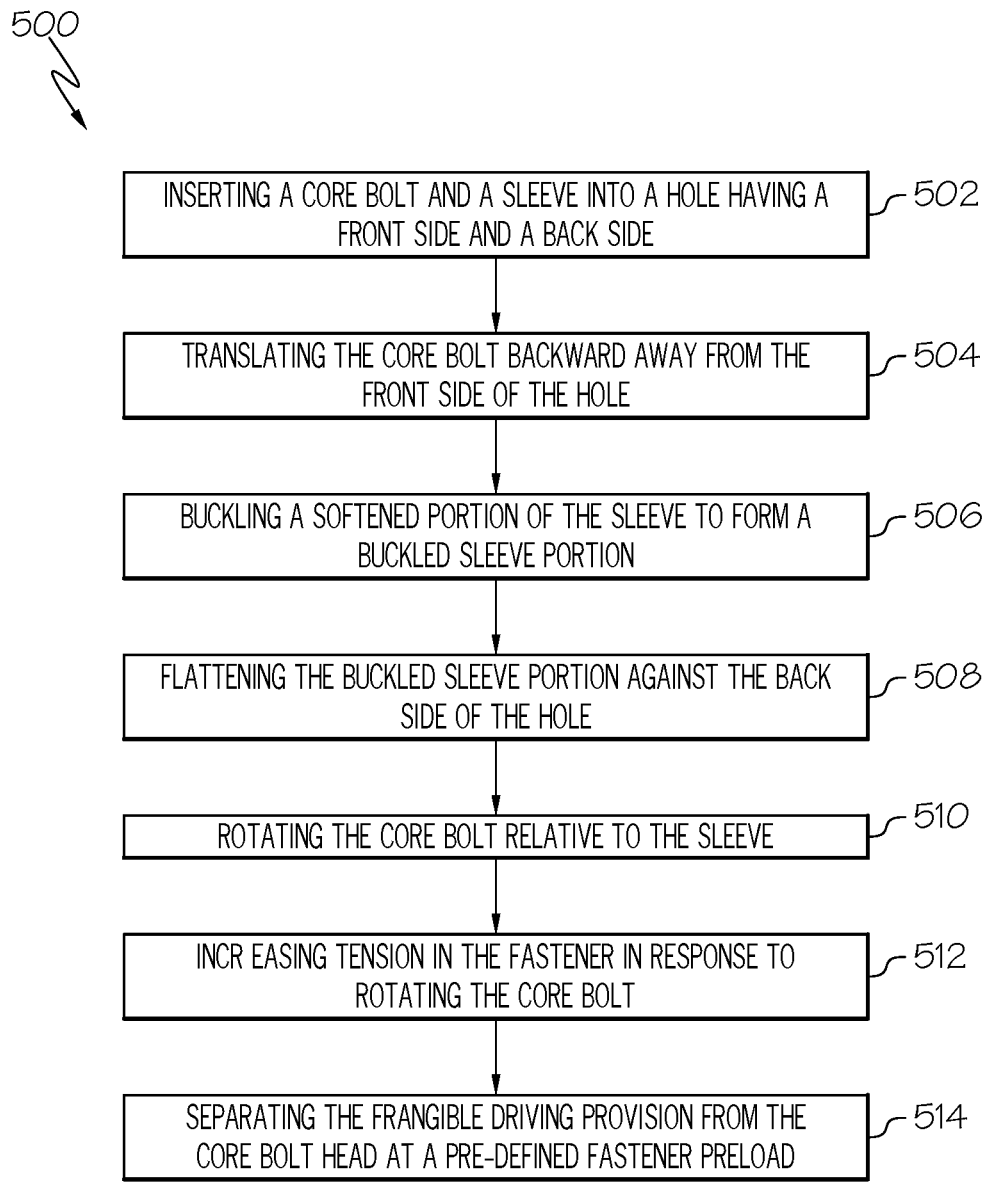
FIG. 23 is a flow diagram including one or more operations that may be included in a method of installing a two-piece, one-sided-installation fastener system.

FIG. 23 is a flow diagram of a method 500 of installing a blind fastener system 100 (FIG. 1) as disclosed above. Advantageously, the blind fastener system 100 and method disclosed herein provides a means for achieving a relatively high preload in the blind fastener system 100 and provides a relatively large bearing area on the back side of a structure 300. In addition, the blind fastener system 100 and method accommodates relatively large structure thickness variations due to the relatively large grip range provided by the blind fastener system 100.

Step 502 of the method 500 of FIG. 23 may comprise inserting a core bolt 150 and a sleeve 104 into a hole 302 of a structure 300 such as an aircraft structure 300 having a front side 304 and a back side 306 as shown in FIG. 6. Although the figures illustrate the structure 300 as comprising a single component, the structure 300 may be comprised of two or more components through which the blind fastener system 100 may be installed. As described above, the core bolt 150 has a frangible driving provision 180 coupled to a core bolt head 152. The frangible driving provision 180 may include an axial translation feature 192 (FIG. 1) and the rotation feature 186 (FIG. 1).

Step 504 of the method 500 of FIG. 23 may comprise translating the core bolt 150 backward away from the front side 304 of the hole 302 as shown in FIGS. 7 and 8. The core bolt 150 may be translated by engaging the axial translation feature 192 of the frangible driving provision 180 as shown in FIGS. 7 and 8. The sleeve head 106 may be maintained against the structure 300 to prevent axial translation thereof relative to the hole 302. In a configuration, the core bolt 150 may preferably be translated without translating or rotating the sleeve 104 and/or without rotating the core bolt 150 relative to the sleeve 104 and preferably without either the core bolt 150 or the sleeve 104 rotating relative to the hole 302.

Step 506 of the method 500 of FIG. 23 may comprise buckling a softened portion 132 of the sleeve 104 against the back side 306 of the structure 300 to form a buckled sleeve portion 138 as shown in FIGS. 7 and 8. The softened portion 132 may buckle radially outwardly into an annular sleeve bulb as the core bolt head 152 is translated away from the front side 304 of the structure 300 as shown in FIGS. 7 and 8.

Step 508 of the method 500 of FIG. 23 may comprise flattening the buckled sleeve portion 138 against the back side 306 of the structure 300 as shown in FIGS. 7 and 8. In this regard, the core bolt 150 may be generally translated along a direction away from the front side 304 of the structure 300 until the buckled sleeve portion 138 is generally flattened against the back side 306 of the structure 300 as shown in FIGS. 7 and 8. However, the process of buckling the softened portion 132 (FIGS. 7 and 8) may be terminated at any point prior to flattening thereof.

Step 510 of the method 500 of FIG. 23 may comprise rotating the core bolt 150 relative to the sleeve 104 as shown in FIG. 9. The core bolt 150 may be rotated by engaging a rotation feature 186 formed on the frangible driving provision 180 as shown in FIG. 9. In a configuration, the rotation feature 186 may comprise one or more faceted surfaces 188 or other rotation feature geometry that may be provided on the frangible driving provision 180 as shown in FIG. 9. During rotation of the core bolt 150, the core bolt head 152 may move back toward and nest within the core bolt pocket 112 in the sleeve head 106 as shown in FIG. 9. During rotation of the core bolt 150, the core bolt threads 160 may engage the locking feature 128 on the sleeve tail 126 as shown in FIG. 9. The method may include preventing rotation of the sleeve 104 relative to the hole 302 when rotating the core bolt 150 relative to the sleeve 104 by engaging an anti-rotation feature 134 (e.g., indentations or protrusions) that may formed on the sleeve head 106 as shown in FIG. 4.

Step 512 of the method 500 of FIG. 23 may comprise increasing tension in the fastener in response to rotating the core bolt 150 relative to the sleeve 104 (FIGS. 9 and 10). Advantageously, after flattening the buckled sleeve portion 138, the sleeve 104 may be restrained against rotation relative to the hole 302 (FIGS. 9 and 10) which may facilitate preloading the fastener. The preload may increase (e.g., in the sleeve 104 and the core bolt 150) until reaching a pre-defined fastener preload 316 level (FIG. 9).

Step 514 of the method 500 of FIG. 23 may comprise separating the frangible driving provision 180 from the core bolt head 152 at the pre-defined fastener preload 316 (FIG. 10). The frangible driving provision 180 may be rotated until separating from the core bolt 150 by exceeding the torsional capability of the interface 198 (FIG. 9) between the frangible driving provision 180 and the core bolt head 152, by pulling on the frangible driving provision 180 (FIG. 10) until exceeding the tension capability at the interface 198, or by bending the frangible driving provision 180 until exceeding the bending capability of the interface 198. The process may include separating the frangible driving provision 180 from the core bolt head 152 at a break groove 184 (FIG. 10) that may be formed at the interface 198 between the frangible driving provision 180 and the core bolt head 152.

Figure 24:
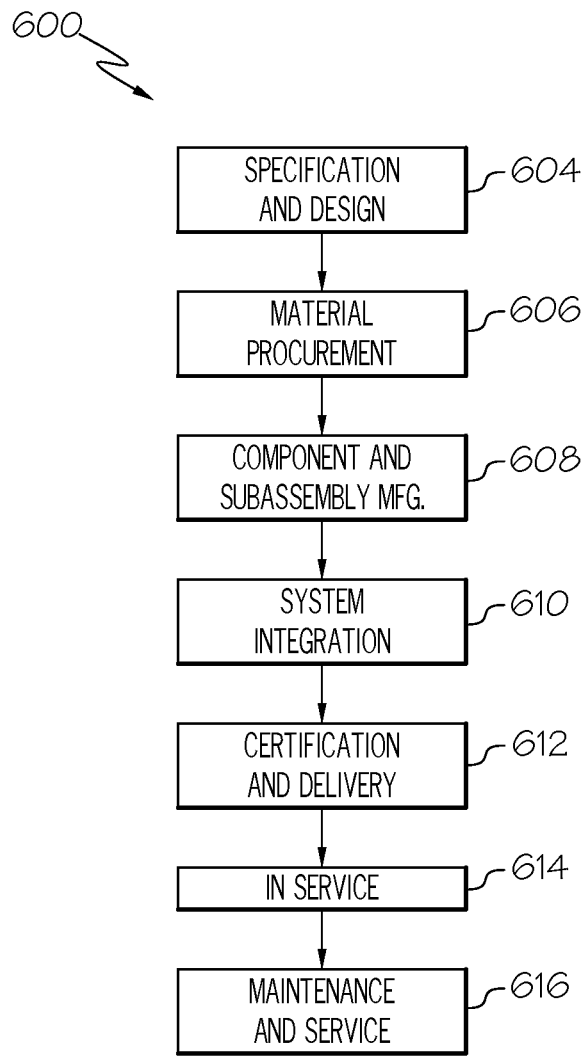
FIG. 24 is a flow diagram of an aircraft manufacturing and service methodology.
Figure 25:
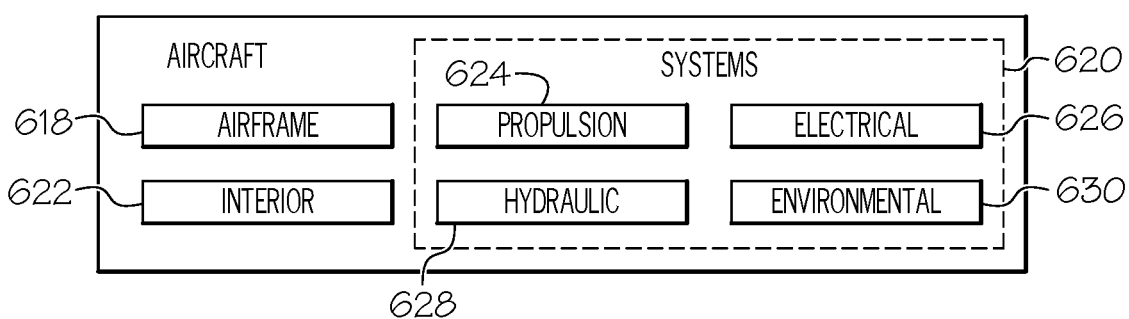
FIG. 25 is a block diagram of an aircraft.

Referring to FIGS. 24 and 25, configurations of the disclosure may be described in the context of an aircraft manufacturing and service method 600 and an aircraft 602 as shown in FIG. 25. During pre-production, exemplary method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on)

Each of the processes of exemplary method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

As shown in FIG. 25, the aircraft 602 produced by exemplary method 600 may include an airframe 618 with a plurality of systems 620 and an interior 622. Examples of high-level systems 620 include one or more of a propulsion system 624, an electrical system 626, a hydraulic system 628, and an environmental system 630. Any number of other systems may be included. Although an aerospace example is shown, the principles of the disclosure may be applied to other industries, such as the automotive industry.

Apparatus and methods configured herein may be employed during any one or more of the processes of the aircraft manufacturing and service method 600. For example, components or subassemblies corresponding to production process 608 may be fabricated or manufactured in a manner similar to components or subassemblies produced while the aircraft 602 is in service 614. Also, one or more apparatus configurations, method configurations, or a combination thereof may be utilized during the production processes 608 and 610, for example, by expediting assembly of or reducing the cost of an aircraft 602. Similarly, one or more apparatus configurations, method configurations, or a combination thereof may be utilized while the aircraft 602 is in service, for example and without limitation, to maintenance and service 616.

Figure 26:
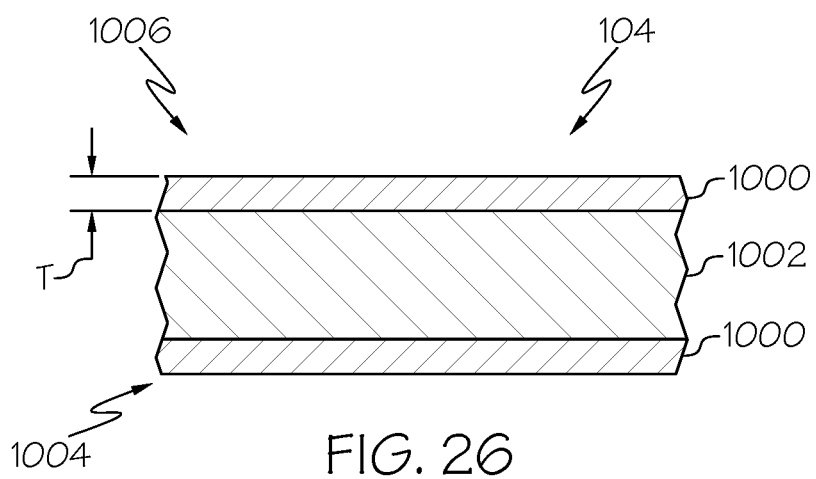
FIG. 26 is a cross-sectional view of a portion of the sleeve of FIG. 3 provided with the disclosed electromagnetic effects-protective coating.

Referring now to FIG. 26, an electromagnetic effects-protective coating 1000 is applied to the body 1002 of the sleeve 104 of the blind fastener system 100 (FIG. 5). Therefore, the body 1002 of the sleeve 104 may have a body composition (e.g., titanium alloy, stainless steel, etc., as is disclosed herein) and the coating 1000 may have a coating composition that is different from the body composition of the sleeve 104.

The disclosed electromagnetic effects-protective coating 1000 may coat the entire sleeve 104. However, coating less than the entire sleeve 104 is also contemplated. In one expression, at least 50 percent of the surface area of the sleeve 104 may be coated with the coating 1000. In another expression, at least 60 percent of the surface area of the sleeve 104 may be coated with the coating 1000. In another expression, at least 70 percent of the surface area of the sleeve 104 may be coated with the coating 1000. In another expression, at least 80 percent of the surface area of the sleeve 104 may be coated with the coating 1000. In another expression, at least 90 percent of the surface area of the sleeve 104 may be coated with the coating 1000.

As shown in FIG. 26, the sleeve 104 may include an exterior surface 1004 and an interior surface 1006. The disclosed electromagnetic effects-protective coating 1000 is shown applied to both the exterior surface 1004 and the interior surface 1006. However, in one variation, the coating 1000 may be applied only one surface, e.g., only the exterior surface 1004 of the sleeve 104.

Figure 27:
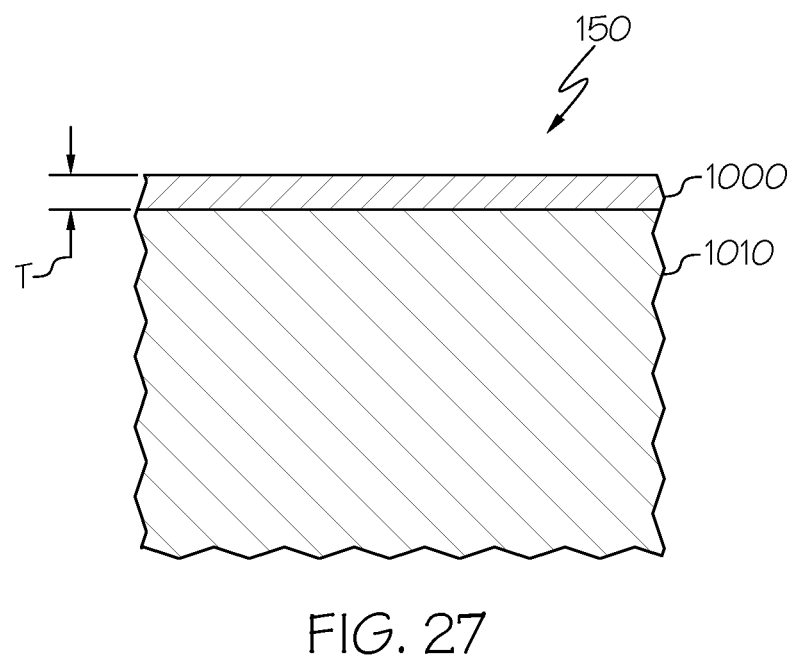
FIG. 27 is a cross-sectional view of a portion of the core bolt of FIG. 1 provided with the disclosed electromagnetic effects-protective coating.

Referring to FIG. 27, the disclosed electromagnetic effects-protective coating 1000 may optionally also be applied to the body 1010 of the core bolt 150 of the blind fastener system 100 (FIG. 5). Therefore, the body 1010 of the core bolt 150 may have a body composition (e.g., titanium alloy, stainless steel, etc., as is disclosed herein) and the coating 1000 may have a coating composition that is different from the body composition of the core bolt 150.

The disclosed electromagnetic effects-protective coating 1000 may coat the entire core bolt 150 (e.g., the entire exterior surface of the core bolt 150). However, coating less than the entire core bolt 150 is also contemplated. In one expression, at least 50 percent of the surface area of the core bolt 150 may be coated with the coating 1000. In another expression, at least 60 percent of the surface area of the core bolt 150 may be coated with the coating 1000. In another expression, at least 70 percent of the surface area of the core bolt 150 may be coated with the coating 1000. In another expression, at least 80 percent of the surface area of the core bolt 150 may be coated with the coating 1000. In another expression, at least 90 percent of the surface area of the core bolt 150 may be coated with the coating 1000.

The disclosed electromagnetic effects-protective coating 1000 is lubricious, thereby facilitating installation of the blind fastener system 100, such as per the disclosed method 500 (FIG. 23). The disclosed coating 1000 is also electrically conductive, thereby providing protection against electromagnetic effects. The disclosed coating 100 is also galvanically compatible with carbon fiber, which facilitates use with structures 300 (FIG. 5) formed from carbon fiber reinforced plastic.

The disclosed electromagnetic effects-protective coating 1000 is metallic. In other words, the disclosed electromagnetic effects-protective coating 1000 is either a metal or a metal alloy.

In one embodiment, the disclosed electromagnetic effects-protective coating 1000 is a metallic coating that includes at least one of tin (Sn), bismuth (Bi) and indium (In). The coating composition of the coating 1000 may be a design consideration, and selection of the coating composition may depend on numerous factors, such as body composition of the underlying body 1002, 1010, the composition of the structure 300 (FIG. 5) in which the blind fastener system 100 (FIG. 5) will be used, and the like.

The disclosed electromagnetic effects-protective coating 1000 may consist essentially of one metal (e.g., tin, bismuth or indium). Alternatively, the coating 1000 may be an alloy that includes at least one of tin, bismuth and indium.

In one expression, the disclosed electromagnetic effects-protective coating 1000 may be (or may include) tin. In other words, the coating 1000 may consist essentially of tin (e.g., may be substantially pure tin), or may be a tin alloy. Suitable tin alloys may include at least about 50 percent by weight tin, such as at least 60 percent by weight tin or at least 75 percent by weight tin. One specific, non-limiting example of a suitable tin alloy is tin-indium (Sn—In). Another specific, non-limiting example of a suitable tin alloy is tin-bismuth (Sn—Bi), wherein the bismuth addition may be about 1 to about 3 percent by weight of the tin-bismuth alloy. Yet another specific, non-limiting example of a suitable tin alloy is tin-zinc (Sn—Zn), wherein the zinc addition may be about 8 to about 15 percent by weight of the tin-zinc alloy. Yet another specific, non-limiting example of a suitable tin alloy is tin-bismuth-zinc (Sn—Bi—Zn), such as 65.5Sn-31.5Bi-3Zn.

In another expression, the disclosed electromagnetic effects-protective coating 1000 may be (or may include) bismuth. In other words, the coating 1000 may consist essentially of bismuth (e.g., may be substantially pure bismuth), or may be a bismuth alloy. Suitable bismuth alloys may be capable of being applied by electroplating, mechanical plating or vapor deposition, and may include at least about 50 percent by weight bismuth, such as at least 60 percent by weight bismuth, or at least 70 percent by weight bismuth, or at least 80 percent by weight bismuth, or at least 90 percent by weight bismuth.

In yet another expression, the disclosed electromagnetic effects-protective coating 1000 may be (or may include) indium. In other words, the coating 1000 may consist essentially of indium (e.g., may be substantially pure indium), or may be an indium alloy. Suitable indium alloys may be capable of being applied by electroplating, mechanical plating or vapor deposition, and may include at least about 50 percent by weight indium, such as at least 60 percent by weight indium, or at least 70 percent by weight indium, or at least 80 percent by weight indium, or at least 90 percent by weight indium. One specific, non-limiting example of a suitable indium alloy is indium-tin (In—Sn).

In one alternative embodiment, the disclosed electromagnetic effects-protective coating 1000 is a metallic coating that consists essentially of aluminum. For example, the coating 1000 may be substantially pure aluminum.

In another alternative embodiment, the disclosed electromagnetic effects-protective coating 1000 is a metallic coating that includes aluminum. In other words, the coating 1000 may be an aluminum alloy.

Various techniques may be used to apply the disclosed electromagnetic effects-protective coating 1000 to the blind fastener system 100 (FIG. 5) without departing from the scope of the present disclosure. One example of a suitable application technique is electroplating. Another example of a suitable application technique is mechanical plating. Still another example of a suitable application technique is vapor deposition.

The disclosed electromagnetic effects-protective coating 1000 may be applied to the blind fastener system 100 to achieve the desired coating thickness T (FIGS. 26 and 27) of the coating 1000. The coating thickness T may be a design consideration, and may depend on numerous factors, such as the coating composition, the size of the blind fastener system 100, the geometry of the blind fastener system 100, and the like. For example, the coating thickness T may range from about 0.00001 inches to about 0.01 inches, such as from about 0.00001 inches to about 0.001 inches or such as from about 0.00001 inches to about 0.0001 inches.

Optionally, the disclosed electromagnetic effects-protective coating 1000 may receive a conversion treatment, such as a phosphate conversion treatment or a chromate conversion treatment. Those skilled in the art will appreciate that use of a conversion treatment may facilitate coating (e.g., painting) all or a portion of the disclosed blind fastener system 100.

While the disclosed electromagnetic effects-protective coating 1000 is presented with reference to the blind fastener system 100 shown and described in detail herein, which includes a sleeve and a core bolt, those skilled in the art will appreciate that the disclosed electromagnetic effects-protective coating 1000 may be used with various sleeve-containing blind fastener systems, either with or without a core bolt (or other feature, such as a mandrel, received in the sleeve), without departing from the scope of the present disclosure. For example, the disclosed electromagnetic effects-protective coating 1000 may be applied to the sleeve (tubular portion) of a blind rivet, such as a pop rivet.

Also disclosed is a method for imparting electromagnetic effects protection to a blind fastener system, wherein the blind fastener system includes a sleeve and, optionally, a core bolt configured to be received in the sleeve. In one embodiment, the disclosed method includes the step of coating at least one of the sleeve and the core bolt with a coating composition that includes at least one of tin, bismuth and indium. In another embodiment, the disclosed method includes the step of coating both the sleeve and the core bolt with a coating composition that includes at least one of tin, bismuth and indium. In another embodiment, the disclosed method includes the step of coating at least one of the sleeve and the core bolt with aluminum (e.g., substantially pure aluminum) or an aluminum alloy. In yet another embodiment, the disclosed method includes the step of coating both the sleeve and the core bolt with aluminum (e.g., substantially pure aluminum) or an aluminum alloy. Conversion treatment may follow the coating step.

Referring now to FIGS. 28-35, disclosed are new core bolts—particularly driving provisions for core bolts. The new driving provisions improve blind fastener system installation, while reducing manufacturing complexity. Once installation is complete, the new driving provisions may be removed from the new core bolts, such as by breaking away, cutting or the like.

Figure 28:
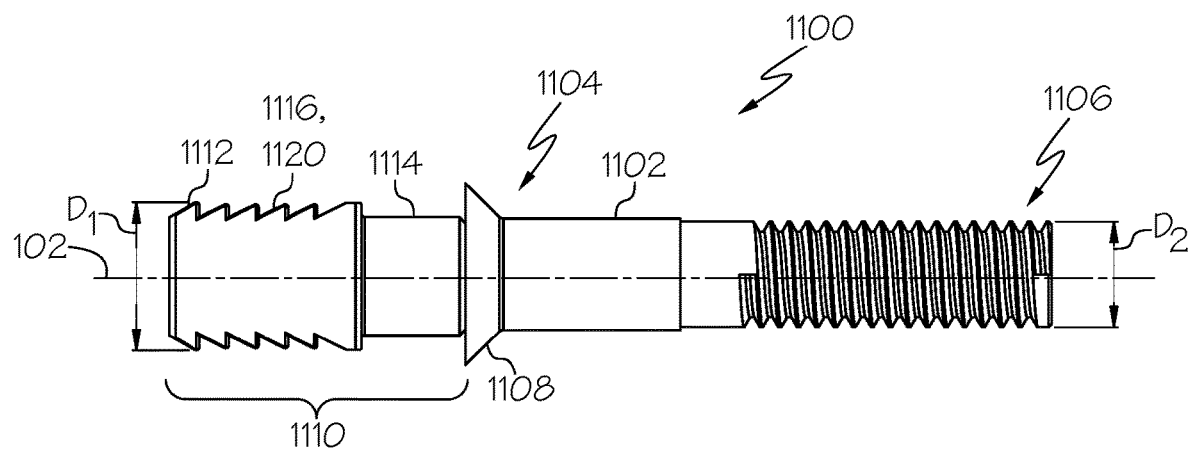
FIG. 28 is a side elevational view of a core bolt in accordance with one alternative configuration of the disclosed blind fastener system.
Figure 29:
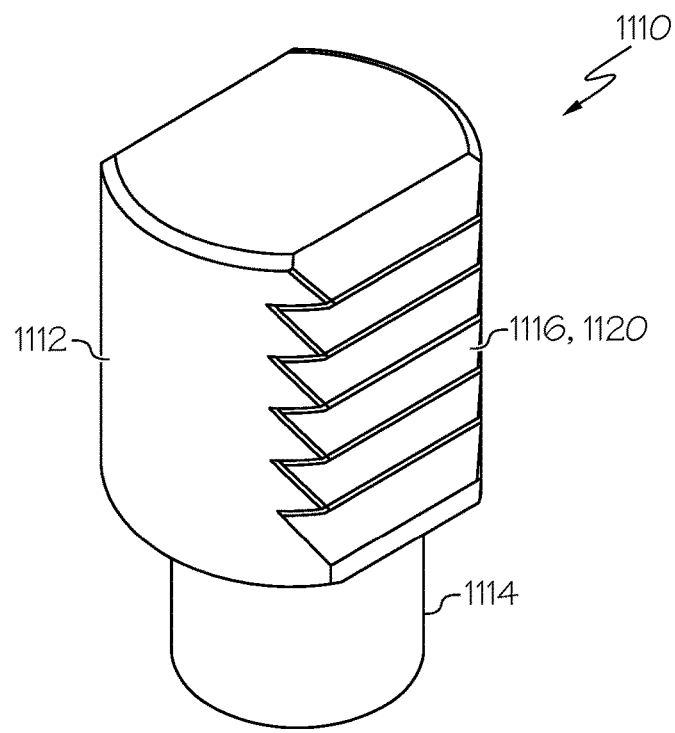
FIG. 29 is a perspective view of the frangible driving provision of the core bolt of FIG. 28.

Referring to FIGS. 28 and 29, core bolt 1100 includes a core bolt shank 1102, which is elongated and includes a first end portion 1104 and an opposed second end portion 1106. A core bolt head 1108 is disposed at the first end portion 1104 of the core bolt shank 1102. The core bolt shank 1102 may be threaded (e.g., entirely or partially).

A driving provision 1110 is connected to the core bolt head 1108 of the core bolt 1100. The driving provision 1110 is intended to be engaged by an installation tool, similar to installation tool 400 (FIG. 11) disclosed herein, to allow the installation tool to axially pull the core bolt 1100 along a fastener axis 102 (pulling) and also to allow the installation tool to rotate the core bolt 1100 about the fastener axis 102 (torqueing). The driving provision 1110 has a greatest transverse dimension $D_1$ that is greater (e.g., substantially greater) than the greatest transverse dimension $D_2$ (the diameter) of the core bolt shank 1102.

The driving provision 1110 includes a head portion 1112 and a shank portion 1114. The head portion 1112 of the driving provision 1110 is configured as a truncated cylinder with laterally opposed truncations 1116, 1118 defining jagged surfaces 1120, 1122. Those skilled in the art will appreciate that the opposed truncations 1116, 1118 may facilitate torqueing, while the jagged surfaces 1120, 1122 may facilitate pulling.

Figure 30:
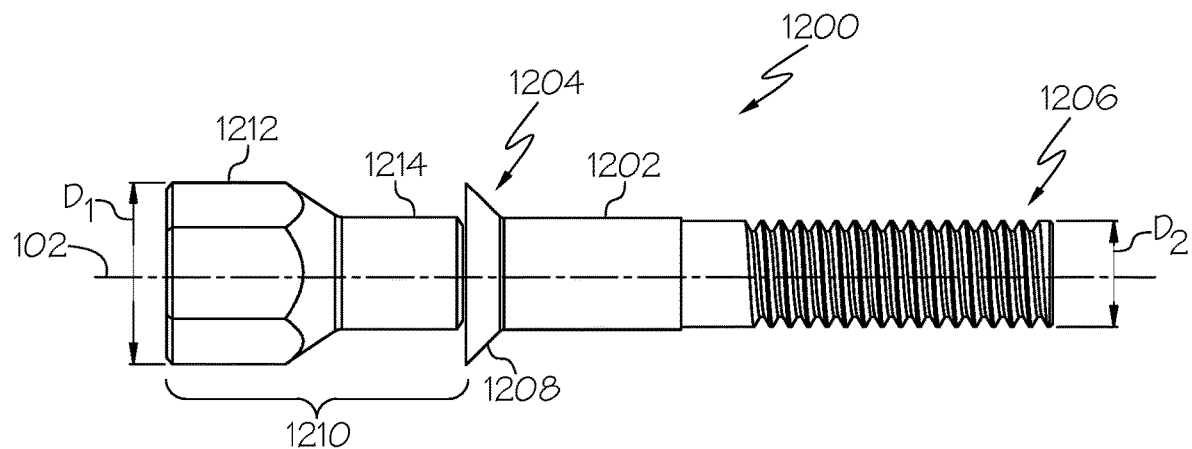
FIG. 30 is a side elevational view of a core bolt in accordance with another alternative configuration of the disclosed blind fastener system.
Figure 31:
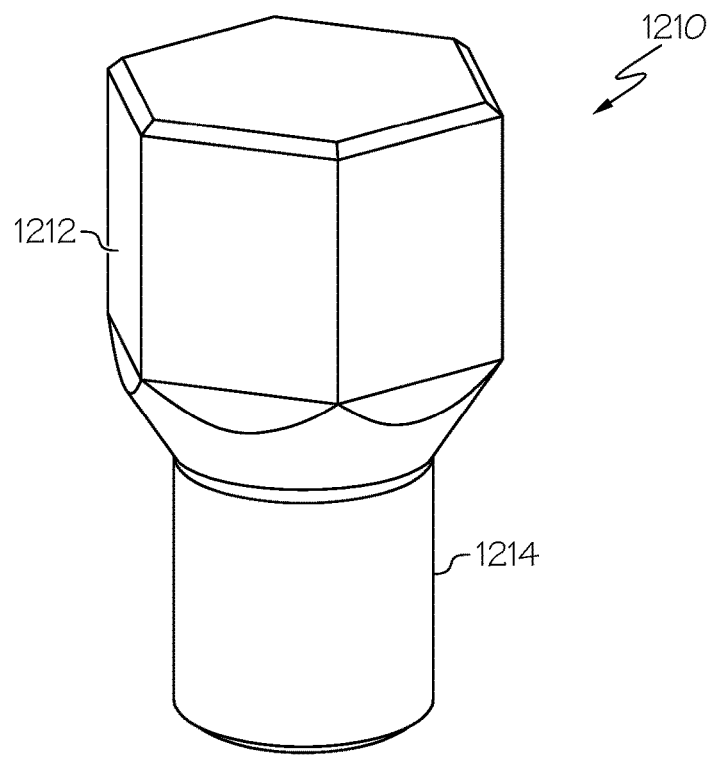
FIG. 31 is a perspective view of the frangible driving provision of the core bolt of FIG. 30.

Referring to FIGS. 30 and 31, core bolt 1200 includes a core bolt shank 1202, which is elongated and includes a first end portion 1204 and an opposed second end portion 1206. A core bolt head 1208 is disposed at the first end portion 1204 of the core bolt shank 1202. The core bolt shank 1202 may be threaded (e.g., entirely or partially).

A driving provision 1210 is connected to the core bolt head 1208 of the core bolt 1200. The driving provision 1210 is intended to be engaged by an installation tool, similar to installation tool 400 (FIG. 11) disclosed herein, to allow the installation tool to axially pull the core bolt 1200 along a fastener axis 102 (pulling) and also to allow the installation tool to rotate the core bolt 1200 about the fastener axis 102 (torqueing). The driving provision 1210 has a greatest transverse dimension $D_1$ that is greater (e.g., substantially greater) than the greatest transverse dimension $D_2$ (the diameter) of the core bolt shank 1202.

The driving provision 1210 includes a head portion 1212 and a shank portion 1214. The head portion 1212 of the driving provision 1210 is hex-shaped. Those skilled in the art will appreciate that the hex-shaped head portion 1212 may facilitate torqueing, while larger greatest transverse dimension $D_1$ of the driving provision 1210 may facilitate pulling.

Figure 32:
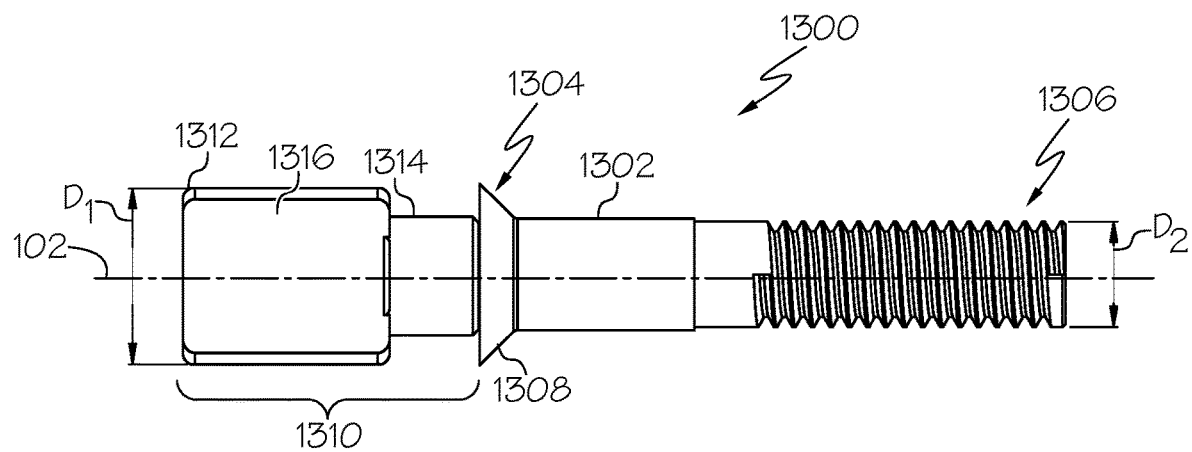
FIG. 32 is a side elevational view of a core bolt in accordance with another alternative configuration of the disclosed blind fastener system.
Figure 33:
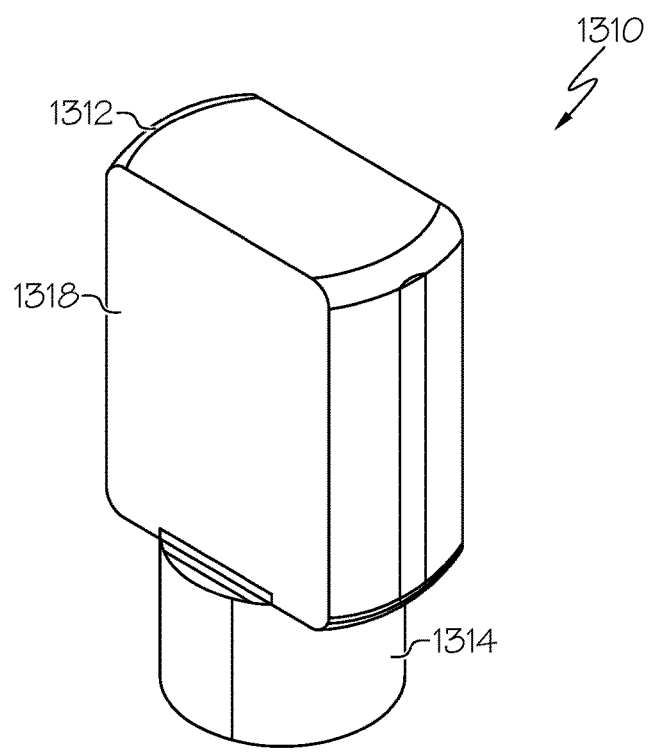
FIG. 33 is a perspective view of the frangible driving provision of the core bolt of FIG. 32.

Referring to FIGS. 32 and 33, core bolt 1300 includes a core bolt shank 1302, which is elongated and includes a first end portion 1304 and an opposed second end portion 1306. A core bolt head 1308 is disposed at the first end portion 1304 of the core bolt shank 1302. The core bolt shank 1302 may be threaded (e.g., entirely or partially).

A driving provision 1310 is connected to the core bolt head 1308 of the core bolt 1300. The driving provision 1310 is intended to be engaged by an installation tool, similar to installation tool 400 (FIG. 11) disclosed herein, to allow the installation tool to axially pull the core bolt 1300 along a fastener axis 102 (pulling) and also to allow the installation tool to rotate the core bolt 1300 about the fastener axis 102 (torqueing). The driving provision 1310 has a greatest transverse dimension $D_1$ that is greater (e.g., substantially greater) than the greatest transverse dimension $D_2$ (the diameter) of the core bolt shank 1302.

The driving provision 1310 includes a head portion 1312 and a shank portion 1314. The head portion 1312 of the driving provision 1310 is configured as a truncated cylinder with laterally opposed truncations 1316, 1318. Those skilled in the art will appreciate that the opposed truncations 1316, 1318 may facilitate torqueing, while larger greatest transverse dimension $D_1$ of the driving provision 1310 may facilitate pulling.

Figure 34:
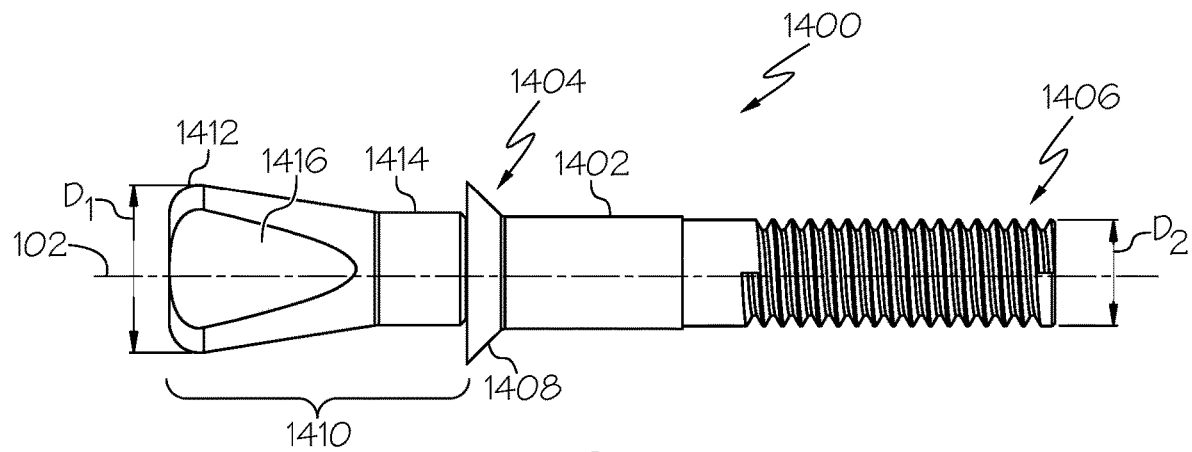
FIG. 34 is a side elevational view of a core bolt in accordance with yet another alternative configuration of the disclosed blind fastener system.
Figure 35:
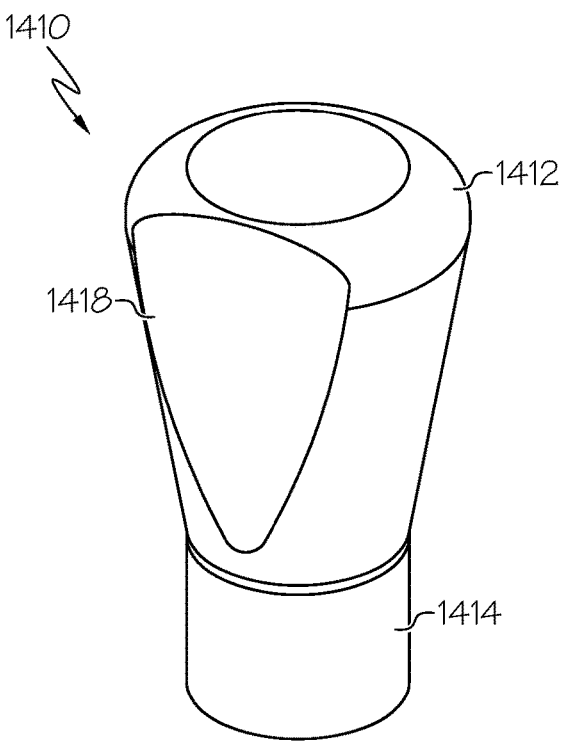
FIG. 35 is a perspective view of the frangible driving provision of the core bolt of FIG. 34.

Referring to FIGS. 34 and 35, core bolt 1400 includes a core bolt shank 1402, which is elongated and includes a first end portion 1404 and an opposed second end portion 1406. A core bolt head 1408 is disposed at the first end portion 1404 of the core bolt shank 1402. The core bolt shank 1402 may be threaded (e.g., entirely or partially).

A driving provision 1410 is connected to the core bolt head 1408 of the core bolt 1400. The driving provision 1410 is intended to be engaged by an installation tool, similar to installation tool 400 (FIG. 11) disclosed herein, to allow the installation tool to axially pull the core bolt 1400 along a fastener axis 102 (pulling) and also to allow the installation tool to rotate the core bolt 1400 about the fastener axis 102 (torqueing). The driving provision 1410 has a greatest transverse dimension $D_1$ that is greater (e.g., substantially greater) than the greatest transverse dimension $D_2$ (the diameter) of the core bolt shank 1402.

The driving provision 1410 includes a head portion 1412 and a shank portion 1414. The head portion 1412 of the driving provision 1410 is bulb-shaped and includes laterally opposed truncations 1416, 1418. Those skilled in the art will appreciate that the opposed truncations 1416, 1418 may facilitate torqueing, while the bulb shape of the head portion 1412 may facilitate pulling.

Although various blind fastener systems with electromagnetic effects-protective coating have been shown and described, modifications may occur to those skilled in the art upon reading the specification. The present application includes such modifications and is limited only by the scope of the claims.

What is claimed is:

1. A blind fastener system comprising:
   a sleeve; and
   a core bolt insertable into the sleeve, the core bolt comprising a core bolt shank and a driving provision connected to the core bolt shank,
   wherein at least one of the sleeve and the core bolt comprises a lubricious metallic coating, wherein the lubricious metallic coating comprises at least one of tin, bismuth, indium and aluminum.

2. The blind fastener system of claim 1 wherein the sleeve comprises the lubricious metallic coating.

3. The blind fastener system of claim 1 wherein the core bolt comprises the lubricious metallic coating.

4. The blind fastener system of claim 1 wherein at least 50 percent of a surface area of the sleeve comprises the lubricious metallic coating.

5. The blind fastener system of claim 1 wherein the sleeve is formed from a metallic material.

6. The blind fastener system of claim 1 wherein the lubricious metallic coating comprises tin.

7. The blind fastener system of claim 1 wherein the lubricious metallic coating comprises tin and bismuth.

8. The blind fastener system of claim 1 wherein the lubricious metallic coating comprises tin and zinc.

9. The blind fastener system of claim 1 wherein the lubricious metallic coating comprises tin, bismuth and zinc.

10. The blind fastener system of claim 1 wherein the lubricious metallic coating comprises tin and indium.

11. The blind fastener system of claim 1 wherein the lubricious metallic coating comprises bismuth.

12. The blind fastener system of claim 1 wherein the lubricious metallic coating comprises indium.

13. The blind fastener system of claim 1 wherein the lubricious metallic coating comprises aluminum.

14. The blind fastener system of claim 1 wherein the lubricious metallic coating comprises substantially pure aluminum.

15. The blind fastener system of claim 1 wherein the driving provision comprises a first greatest transverse dimension and the core bolt shank comprises a second greatest transverse dimension, and wherein the first greatest transverse dimension is substantially greater than the second greatest transverse dimension.

16. The blind fastener system of claim 1 wherein the driving provision comprises a head portion and a shank portion, and wherein the head portion is a truncated cylinder comprising laterally opposed truncations.

17. The blind fastener system of claim 16 wherein the truncations comprise jagged surfaces.

18. The blind fastener system of claim 1 wherein the driving provision comprises a head portion and a shank portion, and wherein the head portion is hex-shaped.

19. The blind fastener system of claim 1 wherein the driving provision comprises a head portion and a shank portion, and wherein the head portion is bulb-shaped and comprises laterally opposed truncations.

20. A method for imparting electromagnetic effects protection to a blind fastener system comprising a sleeve and a core bolt insertable into the sleeve, the method comprising:
   coating the sleeve with a lubricious metallic coating composition comprising at least one of tin, bismuth, indium and aluminum.

21. The method of claim 20 further comprising coating the core bolt with the lubricious metallic coating composition.

\* \* \* \* \*